(12) United States Patent
Griffin

(10) Patent No.: US 11,676,570 B2
(45) Date of Patent: Jun. 13, 2023

(54) ADAPTIVE NOISE CANCELLATION FOR MULTI-ROTOR VEHICLE

(71) Applicant: The Boeing Company, Chicago, IL (US)

(72) Inventor: Steven F. Griffin, Kihei, HI (US)

(73) Assignee: The Boeing Company, Chigaco, IL (US)

(*) Notice: Subject to any disclaimer, the term of this patent is extended or adjusted under 35 U.S.C. 154(b) by 0 days.

(21) Appl. No.: 17/667,668

(22) Filed: Feb. 9, 2022

(65) Prior Publication Data

US 2022/0375449 A1 Nov. 24, 2022

Related U.S. Application Data

(60) Provisional application No. 63/190,742, filed on May 19, 2021.

(51) Int. Cl.

| *G10K 11/178* | (2006.01) |
|---|---|
| *G06V 20/59* | (2022.01) |
| *G06F 3/01* | (2006.01) |
| *H04R 3/00* | (2006.01) |
| *H04R 3/12* | (2006.01) |

(52) U.S. Cl.
CPC ........ *G10K 11/17881* (2018.01); *G06F 3/012* (2013.01); *G06V 20/593* (2022.01); *G10K 11/17823* (2018.01); *G10K 11/17854* (2018.01); *G10K 11/17857* (2018.01); *G10K 11/17883* (2018.01); *H04R 3/005* (2013.01); *H04R 3/12* (2013.01); *G10K 2210/121* (2013.01);

(Continued)

(58) Field of Classification Search
CPC ....... G10K 11/17883; G10K 2210/121; G10K 2210/1281; G10K 2210/3046
See application file for complete search history.

(56) References Cited

U.S. PATENT DOCUMENTS

| 6,002,778 A | 12/1999 | Rossetti et al. |
| 2014/0226831 A1* | 8/2014 | Tzirkel-Hancock ........................ G10K 11/17854 381/71.7 |

(Continued)

FOREIGN PATENT DOCUMENTS

DE 102014201228 A 8/2014

OTHER PUBLICATIONS

The extended European search report for an international application No. EP 22157254, dated Jul. 11, 2022.

*Primary Examiner* — Ping Lee
(74) *Attorney, Agent, or Firm* — Quinn IP Law

(57) ABSTRACT

A noise cancellation system for cancelling sounds within a vehicle. The noise cancellation system includes microphones, a camera, a controller, and speakers. The microphones are disposed adjacent to occupant locations, and configured to generate microphone signals representative of noise sounds and cancellation audio sounds. The camera is configured to generate a video signal that captures head configurations of the occupants. The controller is configured to receive rotor control signals, calculate hearing locations based on tracking data of the head configurations of the occupants, and generate a speaker signals based on the hearing locations, the microphone signals, and the rotor control signals. The speakers are configured to generate the cancellation audio sounds. The cancellation audio sounds attenuate the noise sounds.

17 Claims, 11 Drawing Sheets

(52) U.S. Cl.
CPC .............. *G10K 2210/1281* (2013.01); *G10K 2210/3046* (2013.01); *H04R 2499/13* (2013.01)

(56) References Cited

U.S. PATENT DOCUMENTS

| | | | |
|---|---|---|---|
| 2016/0329040 A1* | 11/2016 | Whinnery | G10K 11/17853 |
| 2019/0088244 A1* | 3/2019 | Goto | B64U 30/20 |
| 2019/0106205 A1 | 4/2019 | Konishi et al. | |
| 2020/0118536 A1 | 4/2020 | Valeri et al. | |

* cited by examiner

ADAPTIVE NOISE CANCELLATION FOR MULTI-ROTOR VEHICLE

CROSS-REFERENCE TO RELATED APPLICATION

The present application claims the benefit of priority to U.S. Provisional Application No. 63/190,742 filed May 19, 2021, which is hereby incorporated by reference in its entirety.

TECHNICAL FIELD

The disclosure relates generally to noise cancellation, and in particular, to adaptive noise cancellation for multi-rotor vehicles.

BACKGROUND

Multi-rotor vehicles are projected as a viable means of human transportation in the future. Various architectures have been proposed, depending on the mission, but common components include a vertical lift and a vertical descent using multiple rotors (or propellers). The lift/descent phases of flight are predicted to result in loud noise inside a cabin to the vehicle. Acoustic pressures measured inside a vehicle during a constrained ground run were sufficiently loud to justify the passengers wearing hearing protection. However, ear muffs and ear plugs are uncomfortable and are often not worn correctly. Active headphones suffer from the same problems.

Accordingly, those skilled in the art continue with research and development efforts in the field of reducing noise inside multi-rotor vehicles. As such, it would be desirable to have a method and a system that account for at least some of the issues discussed above, as well as other possible issues.

SUMMARY

A noise cancellation system for cancelling sounds within a vehicle is provided herein. The noise cancellation system includes a plurality of microphones, a camera, a controller, and a plurality of speakers. The plurality of microphones is disposed adjacent to a plurality of occupant locations inside the vehicle, and is configured to generate a plurality of microphone signals representative of a plurality of noise sounds and a plurality of cancellation audio sounds adjacent to the plurality of occupant locations. The camera is configured to generate a video signal that captures one or more head configurations of one or more occupants at the plurality of occupant locations. The controller is configured to receive a plurality of rotor control signals from a flight control system of the vehicle, calculate a plurality of hearing locations based on tracking of the one or more head configurations of the one or more occupants in response to the video signal, and generate a plurality of speaker signals based on the plurality of hearing locations, the plurality of microphone signals, and the plurality of rotor control signals. The plurality of speakers is disposed adjacent to the plurality of occupant locations, and is configured to generate the plurality of cancellation audio sounds in response to the plurality of speaker signals. The plurality of cancellation audio sounds attenuate the plurality of noise sounds at the plurality of hearing locations.

In one or more embodiments of the noise cancellation system, each of the one or more head configurations comprises a respective spatial head location and a respective spatial head orientation, and the controller is further configured to determine either a single closest microphone or two closest microphones among the plurality of microphones for each of the plurality of hearing locations based on the respective spatial head location and the respective spatial head orientation.

In one or more embodiments of the noise cancellation system, the controller is further configured to generate a respective error signal for each of the plurality of hearing locations as either a respective microphone signal from the single closest microphone or a blend of two respective microphone signals from the two closest microphones.

In one or more embodiments of the noise cancellation system, the controller is further configured to generate a respective weighted rotor control signal for each respective hearing location of the plurality of hearing locations based on the plurality of rotor control signals and the respective hearing location, and generate a respective correction signal for each of the plurality of hearing locations in response to the respective error signal and the respective weighted rotor control signal. The plurality of cancellation audio sounds is based on a combination of the respective correction signals.

In one or more embodiments of the noise cancellation system, the plurality of noise sounds is generated by a plurality of rotors of the vehicle in response to the plurality of rotor control signals.

In one or more embodiments, the noise cancellation system includes a plurality of rotor sensors coupled to the plurality of rotors, and configured to generate a plurality of rotor sensor signals representative of a plurality of rotational speeds of the plurality of rotors.

In one or more embodiments of the noise cancellation system, the controller is further configured to generate a respective weighted rotor sensor signal for each respective hearing location of the plurality of hearing locations based on the plurality of rotor sensor signals and the respective hearing location, and generate a respective correction signal for each of the plurality of hearing locations in response to the respective error signal and the respective weighted rotor sensor signal. The plurality of cancellation audio sounds is based on a combination of the respective correction signals.

In one or more embodiments of the noise cancellation system, the controller is further configured to generate a respective correction signal for each of the plurality of hearing locations by adaptive noise cancellation of the respective error signal, and generate a plurality of internal signals for each of the plurality of hearing locations by parsing the respective correction signal among the plurality of speakers.

In one or more embodiments of the noise cancellation system, the controller is further configured to generate a plurality of respective component signals for each of the plurality of hearing locations by adjusting the plurality of internal signals, and generate the plurality of speaker signals for each of the plurality of hearing locations by summing the plurality of respective component signals of the plurality of hearing locations.

A method for cancelling sounds within a vehicle is provided herein. The method includes generating a plurality of microphone signals representative of a plurality of noise sounds and a plurality of cancellation audio sounds adjacent to a plurality of occupant locations within the vehicle, generating a video signal that captures one or more head configurations of one or more occupants at the plurality of occupant locations, and receiving a plurality of rotor control signals at a controller from a flight control system of the vehicle. The method includes calculating a plurality of hearing locations of the one or more occupants based on tracking of the one or more head configurations in response to the video signal, generating a plurality of speaker signals based on the plurality of hearing locations, the plurality of microphone signals, and the plurality of rotor control signals, and generating the plurality of cancellation audio sounds in response to the plurality of speaker signals. The plurality of cancellation audio sounds attenuates the plurality of noise sounds at the plurality of hearing locations.

In one or more embodiments of the method, each of the one or more head configurations comprises a respective spatial head location and a respective spatial head orientation, and the method includes determining either a single closest microphone or two closest microphones among a plurality of microphones for each of the plurality of hearing locations based on the respective spatial head location and the respective spatial head orientation.

In one or more embodiments, the method includes generating a respective error signal as either a respective microphone signal from the single closest microphone or a blend of two respective microphone signals from the two closest microphones for each of the plurality of hearing locations.

In one or more embodiments, the method includes generating a respective weighted rotor control signal for each respective hearing location of the plurality of hearing locations based on the plurality of rotor control signals and the respective hearing location, and generating a respective correction signal for each of the plurality of hearing locations in response to the respective error signal and the respective weighted rotor control signal. The plurality of cancellation audio sounds is based on a combination of the respective correction signals.

In one or more embodiments of the method, the plurality of noise sounds is generated by a plurality of rotors of the vehicle in response to the plurality of rotor control signals.

In one or more embodiments, the method includes generating a plurality of rotor sensor signals representative of a plurality of rotational speeds of a plurality of rotors.

In one or more embodiments, the method includes generating a respective weighted rotor sensor signal for each respective hearing location of the plurality of hearing locations in response to the plurality of rotor sensor signals and the respective hearing location, and generating a respective correction signal for each of the plurality of hearing locations in response to the respective error signal and the respective weighted rotor sensor signal. The plurality of cancellation audio sounds is based on a combination of the respective correction signals.

In one or more embodiments, the method includes generating a respective correction signal for each of the plurality of hearing locations by adaptive noise cancellation of the respective error signal, generating a plurality of internal signals for each of the plurality of hearing locations by parsing the respective correction signal among a plurality of speakers, generating a plurality of respective component signals for each of the plurality of hearing locations by adjusting the plurality of internal signals, and generating the plurality of speaker signals by summing the plurality of respective component signals of the plurality of hearing locations.

A vehicle is provided herein. The vehicle includes a plurality of rotors, a plurality of rotor sensors, a computer, and a plurality of speakers. The plurality of rotors is configured to receive a plurality of rotor control signals, and generate a plurality of noise sounds at a plurality of occupant locations inside the vehicle in response to the plurality of rotor control signals. The plurality of rotor sensors is coupled to the plurality of rotors, and configured to generate a plurality of rotor sensor signals representative of a plurality of rotational speeds of the plurality of rotors. The computer is coupled to the plurality of rotor sensors, and configured to generate a plurality of microphone signals representative of the plurality of noise sounds and a plurality of cancellation audio sounds adjacent to the plurality of occupant locations, generate a video signal that captures one or more head configurations of one or more occupants at the plurality of occupant locations, receive the plurality of rotor control signals, calculate a plurality of hearing locations of the one or more occupants based on tracking of the one or more head configurations in response to the video signal, and generate a plurality of speaker signals based on the plurality of hearing locations, the plurality of microphone signals, the plurality of rotor control signals, and the plurality of rotor sensor signals. The plurality of speakers is configured to generate the plurality of cancellation audio sounds in response to the plurality of speaker signals. The plurality of cancellation audio sounds attenuates the plurality of noise sounds at the plurality of hearing locations.

In one or more embodiments of the vehicle, the computer is further configured to generate a respective error signal for each of the plurality of hearing locations in response to at most two of the plurality of microphone signals, generate a respective weighted rotor control signal for each respective hearing location of the plurality of hearing locations based on the plurality of rotor control signals and the respective hearing location, and generate a respective correction signal for each of the plurality of hearing locations in response to the respective error signal and the respective weighted rotor control signal. The plurality of speaker signals is generated in response to a combination of the respective correction signals for the plurality of hearing locations.

In one or more embodiments of the vehicle, the computer is further configured to generate a respective error signal for each of the plurality of hearing locations in response to at most two of the plurality of microphone signals, generate a respective weighted rotor sensor signal for each respective hearing location of the plurality of hearing locations based on the plurality of rotor sensor signals and the respective hearing location, and generate a respective correction signal for each of the plurality of hearing locations in response to the respective error signal and the respective weighted rotor sensor signal. The plurality of speaker signals is generated in response to a combination of the respective correction signals for the plurality of hearing locations.

The above features and advantages, and other features and advantages of the present disclosure are readily apparent from the following detailed description of the best modes for carrying out the disclosure when taken in connection with the accompanying drawings.

DETAILED DESCRIPTION

Embodiments of the present disclosure include a method and/or a system that provide noise cancellation in a multi-rotor vehicle where the occupants are not wearing individual noise-cancellation headphones. The system includes a sound system with multiple speakers throughout a passenger cabin for playing sounds within the vehicle. At least one camera is directed toward occupant locations within the vehicle for tracking head locations and movement of the occupants. An array of microphones is disposed adjacent each occupant location within the vehicle for monitoring and averaging the sounds at the head location of each respective occupant. A controller interprets the input data from the at least one camera and the array of microphones, and generates cancelling sounds played through the speakers to attenuate unpleasant rotor-created noise within the vehicle.

Various embodiments implement adaptive noise cancellation within the multi-rotor vehicle cabin using the sound system, operator/passenger microphones, and camera to implement head tracking. The nature of the sound is related to the spinning rotors at either a fundamental and/or harmonic(s) of the blade passage frequencies. The multi-rotor vehicles are suitable for adaptive noise cancellation with much of the sound emanating from the rotors (also referred to as propellers) with a known input reference, the majority of the sound is at relatively low frequencies/long wavelengths, and the relatively small cabin volume provides low acoustic modal density at frequencies where the sound levels are high. Use of head tracking with the cameras and microphone averaging to optimize sound cancellation in the neighborhood of the head of the operator/passenger improves the noise cancellation.

Figure 1:
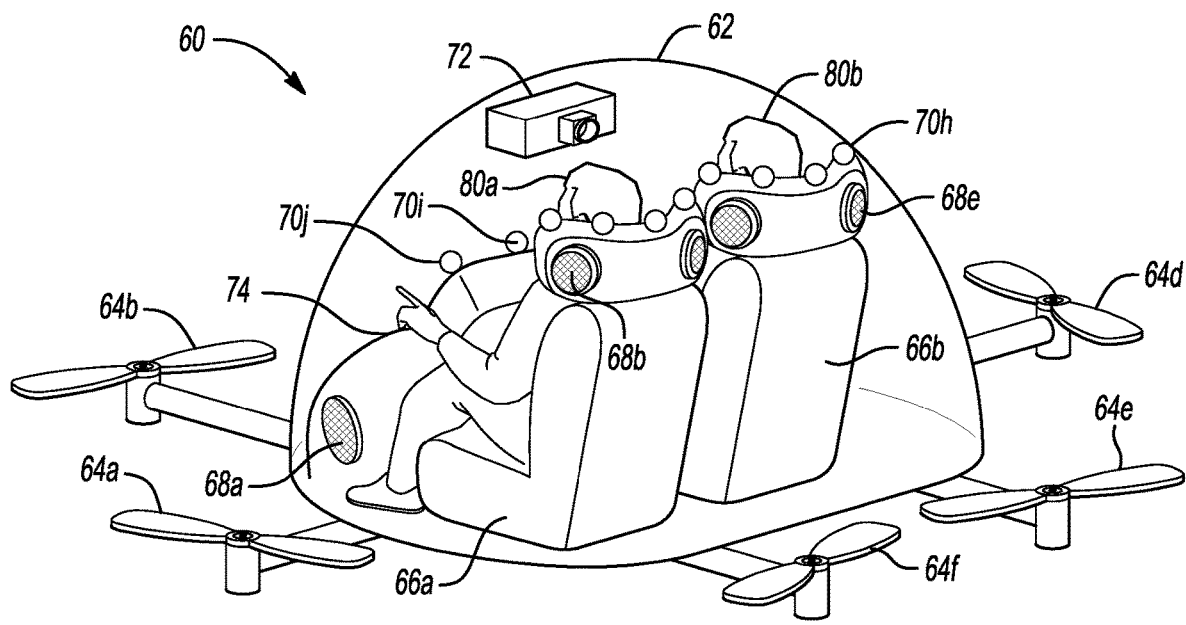
FIG. 1 is a semi-transparent perspective diagram of a vehicle in accordance with one or more exemplary embodiments.
Figure 2:
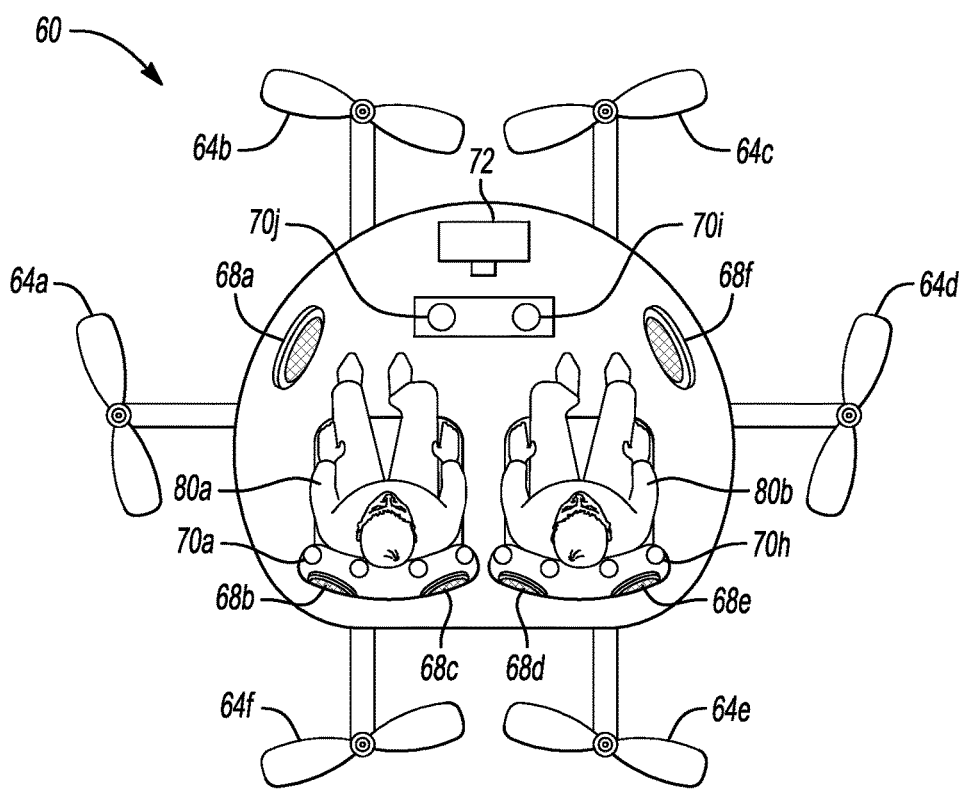
FIG. 2 is a semi-transparent plan diagram of the vehicle in accordance with one or more exemplary embodiments

Referring to FIGS. 1 and 2, a semi-transparent perspective diagram and a semi-transparent plan diagram of an example implementation of a vehicle 60 are shown in accordance with one or more exemplary embodiments. The vehicle 60 generally comprises a cabin 62, multiple rotors 64a-64f, multiple occupant locations 66a-66b, multiple speakers 68a-68f, multiple microphones 70a-70j, one or more cameras 72 (one shown), and a center console 74.

The vehicle 60 may include, but is not limited to, a multi-rotor vehicle (illustrated), a multi-rotor helicopter, a multi-rotor fixed-wing aircraft, a multi-propeller boat, or a ground vehicle. The vehicle 60 is configured to carry one or more occupants 80a-80b (or crew members).

The cabin 62 defines an interior space of the vehicle 60. The cabin 62 is sized to fit the occupants 80a-80b. Acoustic noise generated by the rotors 64a-64f outside the cabin 62 may be audible inside the cabin 62 by the occupants 80a-80b.

The rotors 64a-64f implement propellers coupled to drive motors. The rotors 64a-64f are disposed outside the cabin 62 of the vehicle 60. The rotors 64a-64f are operational to provide lift and thrust to the vehicle 60 sufficient to enable flight. The rotors 64a-64f are generally spread around an outer perimeter of the vehicle 60, and provide similar lifting capabilities on each side. Noise sounds are created while the rotors 64a-64f, in particular the propellers, are in motion.

The occupant locations 66a-66b implement multiple seats. The occupant locations 66a-66b are disposed inside the cabin 62. In various embodiments, several (e.g., two) occupant locations 66a-66b may be implemented in a single row. Some embodiments may include more than two occupant locations 66a-66b. In other embodiments, may arrange the occupant locations 66a-66b in more than one row.

The speakers 68a-68f implement audio speakers. The speakers 68a-68f are disposed inside the cabin 62 around the occupant locations 66a-66b. The speakers 68a-68f are operational to generate cancellation audio sounds that attenuate the noise sounds generated by the rotors 64a-64f.

The microphones 70a-70j implement audio microphones. The microphones 70a-70j are disposed inside the cabin 62 adjacent the occupant locations 66a-66b. The microphones 70a-70j are operational to measure noise levels near the ears of the occupants 80a-80b.

The cameras 72 implement video cameras. The cameras 72 are disposed inside the cabin 62 and face the occupant locations 66a-66b. The cameras 72 are operational to capture images of the occupants 80a-80b in sufficient detail to estimate orientations of heads of the occupants 80a-80b. From the orientation, the spatial positions of the ears of the occupants 80a-80b may be determined.

In the example embodiment illustrated in FIGS. 1 and 2, several (e.g., four) speakers 68b-68e are disposed in headrests of the seats (e.g., the occupant locations 66a-66b). Additional (e.g., two) speakers 68a and 68f are positioned near the feet of the occupants 80a-80b. Multiple (e.g., eight) microphones 70a-70h are positioned along a top of the headrest. Additional (e.g., two) microphones 70i and 70j are positioned at the center console 74. A computer (See FIG. 4) is mounted inside the center console 74. The camera 72 is located in a traditional rearview mirror position of an automobile. The occupants 80a-80b are shown sitting in the occupant locations 66a-66b. Several (e.g., six) rotors 64a-64f are positioned around an exterior of the vehicle 60.

The speakers 68a-68f, the microphones 70a-70j, the camera 72, and the computer in the center console 74 generally implement a technique for cancelling noise sounds with the cabin 62 due to operation of the rotors 64a-64f. The method includes generating multiple microphone signals using the microphones 70a-70j. The microphone signals are representative of the noise sounds generated by the rotors 64a-64f and several cancellation audio sounds generated by the speakers 68a-68f near the occupant locations 66a-66b within the vehicle 60. A video signal that captures one or more head configurations of one or more occupants 80a-80b at the occupant locations 66a-66b is generated by the camera 72 and transferred to the computer. The computer receives multiple rotor control signals from a flight control system of the vehicle 60. Multiple hearing locations (e.g., the spatial locations of the ears) of the one or more occupants 80a-80b are determined by tracking the one or more head configurations in response to the video signal. Several speaker signals are generated by the computer based on the hearing locations, the microphone signals, and the rotor control signals. The speakers 68a-68f generate the cancellation audio sounds in response to the speaker signals. The cancellation audio sounds attenuate the noise sounds at the hearing locations.

To tune the vehicle 60 to work for adaptive noise cancellation with multi-rotor operation, multiple adaptive noise cancellation loops are implemented for each ear of each occupant 80a-80b Control signals for the rotors 64a-64f and/or sensor signals from rotor sensors (see FIG. 4) provide reference signals for adaptive noise cancellation loops. Some choices for a reference sensor for an individual rotor 64a-64f may be a revolutions per minute (RPM) sensor (e.g., a tachometer), an accelerometer mounted on the arm that holds the rotor 64a-64f, or a microphone either near the propeller or immediately inside the vehicle 60 where the arm attaches for an individual rotor 64a-64f Since harmonics of the rotational frequency of an individual propeller often make up a majority of the noise, if a sensor that does not sense harmonics (like a tachometer) is selected, additional characterization of the effective gain and phase of the harmonics may be implemented. Once the characterized is performed, the characterization generally does not change significantly for each propeller.

Figure 3:
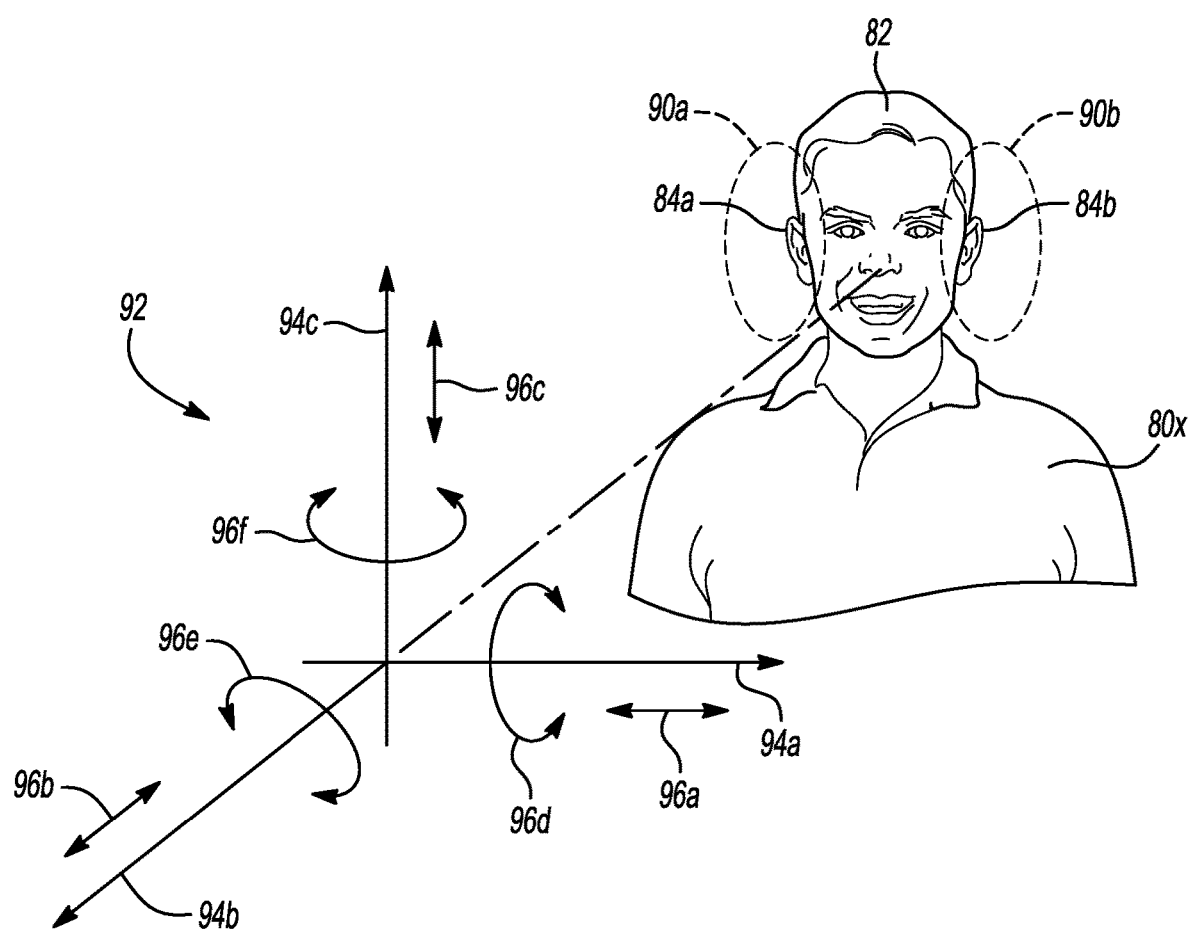
FIG. 3 is a schematic diagram illustrating an occupant of the vehicle in accordance with one or more exemplary embodiments.

Referring to FIG. 3, a schematic diagram illustrating an example occupant 80x is shown in accordance with one or more exemplary embodiments. The occupant 80x is representative of the potential occupants 80a-80b that may be in the vehicle 60. The occupant 80x includes a head 82, and two ears 84a-84b that establish two movable hearing locations 90a-90b. The hearing locations 90a-90b may be calculated by the computer based on tracking a center of the head 82 and an estimated spatial offset from the center of the head 82 to each ear 84a-84b.

A Cartesian coordinate system 92 centered on the head 82 generally defines a head configuration 94a-96f The coordinate system 92 includes a first (e.g., x or horizontal) axis 94a, a second (e.g., y or horizontal) axis 94b, and a third (e.g., z or vertical) axis 94c. The axes 94a, 94b, and 94c are perpendicular to each other. The head 82 of the occupant 80x may move in six degrees of freedom. The six degrees include three motions: a left/right (or sway) motion 96a along the first axis 94a; a forward/backward (or surge) motion 96b along the second axis 94b; and an up/down (or heave) motion 96c along the third axis 94c. The six degrees include three rotations: a transverse rotation (or pitch) 96d about the first axis 94a, a longitudinal rotation (or roll) 96e about the second axis 94b; and a normal rotation (or yaw) 96f about the third axis 94c. A spatial head location may be defined by the center of the head 82 at three coordinates along the three axes 94a, 94b, and 94c. A spatial head orientation may be defined by an angle of the head 82 at three points along the rotations 96d, 96e, and 96f.

Figure 4:
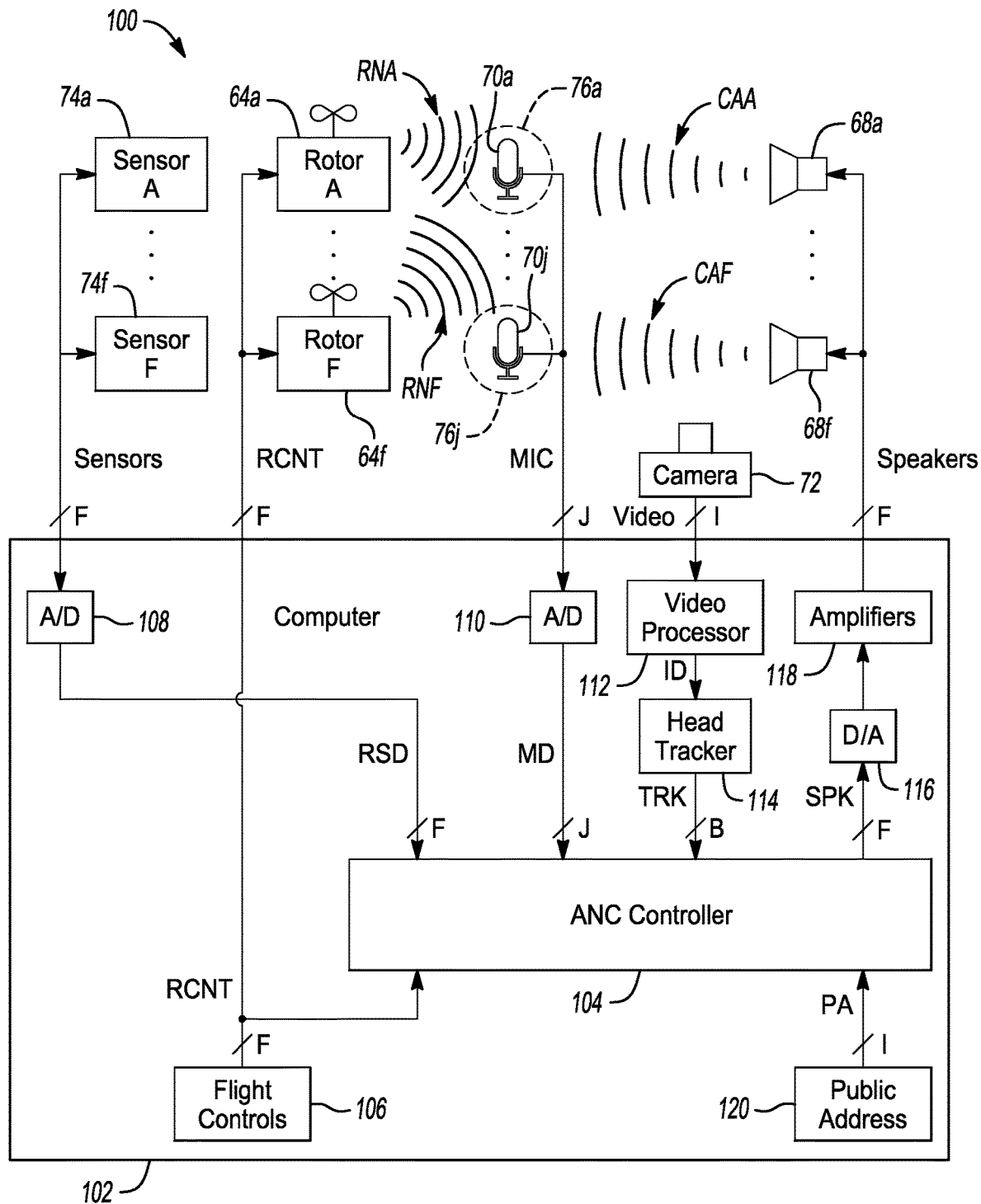
FIG. 4 is a schematic diagram of an adaptive noise cancellation system in accordance with one or more exemplary embodiments.

Referring to FIG. 4, a schematic diagram of an example implementation of an adaptive noise cancellation system 100 is shown in accordance with one or more exemplary embodiments. The adaptive noise cancellation system 100 is operational to attenuate rotor noise sounds (e.g., RNA-RNF) generated by the rotors 64a-64f at several cancelling fields 76a-76j. The cancelling fields 76a-76j vary in time and spatial location based on the head configuration 94a-96f of the occupants 80a-80b as the occupants 80a-80b move about within the cabin 62.

The adaptive noise cancellation system 100 includes the speakers 68a-68f; the microphones 70a-70j, the camera 72, multiple rotor sensors 74a-74f, and a computer 102. The computer 102 generally includes a controller 104, a flight control system 106, a sensor analog-to-digital (A/D) converter 108, an audio analog-to-digital converter 110, a video processor 112, a head tracker 114, a digital-to-analog (D/A) converter 116, multiple amplifiers 118, and a public address system 120.

The rotor sensors 74a-74f generate initial rotor sensor signals (e.g., SENSOR) that are transferred to the sensor analog-to-digital converter 108. The initial rotor sensor signals SENSOR convey data that indicates the rotational speeds (or frequencies) of the rotors 64a-64f. Rotor sensor signals (e.g., RSD) are generated by the sensor analog-to-digital converter 108 and provided to the controller 104. The rotor sensor signals RSD convey the rotational speeds from the initial rotor sensor signals SENSOR in digital form. Rotor control signals (RCNT) are generated by the flight control system 106 and transferred to the rotors 64a-64f and the controller 104. The rotor control signals RCNT specify the rotational speed in revolutions per minutes, in one example, at which each of the rotors 64a-64f operate.

The microphones 70a-70j generate initial microphone signals (e.g., MIC) that are transferred to the audio analog-to-digital converter 110. The initial microphone signals MIC carry error sounds sensed in the cancelling fields 76a-76j where the cancellation audio sounds CAA-CAF incompletely nullify the rotor noise sounds RNA-RNF. The audio analog-to-digital converter 110 generated microphone signals (e.g., MD) are presented to the controller 104. The microphone signals MD convey digitized versions of the error sounds from the initial microphone signals MIC.

A video signal (e.g., VIDEO) is generated by the camera 72 and transferred to the video processor 112. The video signal VIDEO carries images of the heads 82 of the occupants 80a-80b. Identification signals (e.g., ID) are generated by the video processor 112 and transferred to the head tracker 114. The identification signals ID carry data used to identify the head 82 of each occupant 80a-80b in the images. Track signals (e.g., TRK) are generated by the head tracker 114 and received by the controller 104. The track signals TRK carry the head configurations 94a-96f of the occupants 80a-80b.

A public address signal (e.g., PA) is generated by the public address system 120 and transferred to the controller 104. The public address signal PA carries audio information intended to be heard by the occupants 80a-80b. The controller 104 generates speaker signals (e.g., SPK) that are received by the digital-to-analog converter 116. The speaker signals SPK convey cancellation sounds and the public address audio in digital form. The digital-to-analog converter 116 converts the cancellation sounds and the public address audio from digital form to an analog form that are received by the amplifiers 118. Amplified speaker signals (e.g., SPEAKERS) are generated by the amplifiers 118 and drive the various speakers 68a-68f. The amplified speaker signals SPEAKERS convey the cancellation sounds and the public address audio with sufficient power to drive the speakers 68a-68f The speakers 68a-68f generate cancellation audio sounds (e.g., CAA-CAF) directed to the cancelling fields 76a-76j. The cancellation audio sounds CAA- CAF convey acoustic signals having amplitudes and phases that attenuate the rotor noise sounds RNA-RNF in the cancelling fields 76a-76j.

The rotor sensors 74a-74f implement revolutions per minute sensors. The rotor sensor 74a-74f are operational to sense the rotational speed of the respective rotors 64a-64f and report the sensed rotational speeds to the computer 102 in the initial rotor sensor signals SENSORS. In various embodiments, the rotor sensors 74a-74f may be tachometers, accelerometers mounted on the arms that holds the rotor 64a-64f, or microphones either near the propellers or immediately inside the vehicle 60 where the arms attach for the individual rotor 64a-64f.

The controller 104 implements an adaptive noise cancellation controller. The controller 104 is operational to reduce the acoustic noise heard at various locations inside the cabin 62. In a baseline situation, the adaptive noise cancellation is based on estimated rotor noise as determined from the rotor control signals RCNT, and error noise in the microphone signals MD as measured by the microphones 70a-70j. In some situations, the adaptive noise cancellation may also be responsive to estimated rotor noise as determined from the rotor sensor signals RSD. The controller 104 is further operational to improve the adaptive noise cancellation by accounting for head movements of the occupants 80a-80b around in the cabin 62. The controller 104 is informed of the spatial head locations via the head tracker 114 in the track signals TRK. The controller 104 subsequently adjusts the noise cancellation has the head movement generally positions the head closer to some rotors 64a-64f and some speakers 68a-68f while positioning the head further from other rotors 64a-64f and other speakers 68a-68f. Since the microphones 70a-70j are in fixed positions, the controller 104 may use the head movement data to adjust which among the microphones 70a-70j are best representative of the rotor noise at the current head and ear positions.

The flight control system 106 is operational to control flight of the vehicle 60 by controlling the rotational speeds of the rotors 64a-64f. The flight control system 106 commands the rotational speeds of the rotors 64a-64f by presenting control data in the rotor control signals RCNT. The control data is used by the controller 104 to adjust the adaptive noise cancellation operations to account for changes in the speeds of the rotors 64a-64f.

The video processor 112 is operational to capture and identify the heads 82 of the occupants 80a-80b in the video signal VIDEO generated by the camera 72. The video processor 112 presented the head locations and head orientations in spatial terms relative to the cabin 62 to the head tracker 114 in the identification signals ID. In various embodiments, standard video processing techniques may be implemented.

The head tracker 114 is operational to track the spatial locations and orientations of the heads 82 of the occupants 80a-80b based on the data received in the identification signals ID. The spatial locations and orientations of the heads 82 are presented in the track signals TRK to the controller 104. In various embodiments, standard head tracking techniques may be implemented.

The amplifiers 118 implement audio power amplifiers. The amplifiers 118 are operational to drive the speakers 68a-68f thereby creating the cancellation audio sounds CAA-CAF determined by the controller 104, and public address information created by the public address system 120.

The public address system 120 is operational to generate audio messages in the public address signal PA. The audio messages include, but are not limited to, messages received by a receiver (not shown) in the vehicle 60, warning messages automatically generated by the onboard electronics, navigation messages, and the like.

Figure 5:
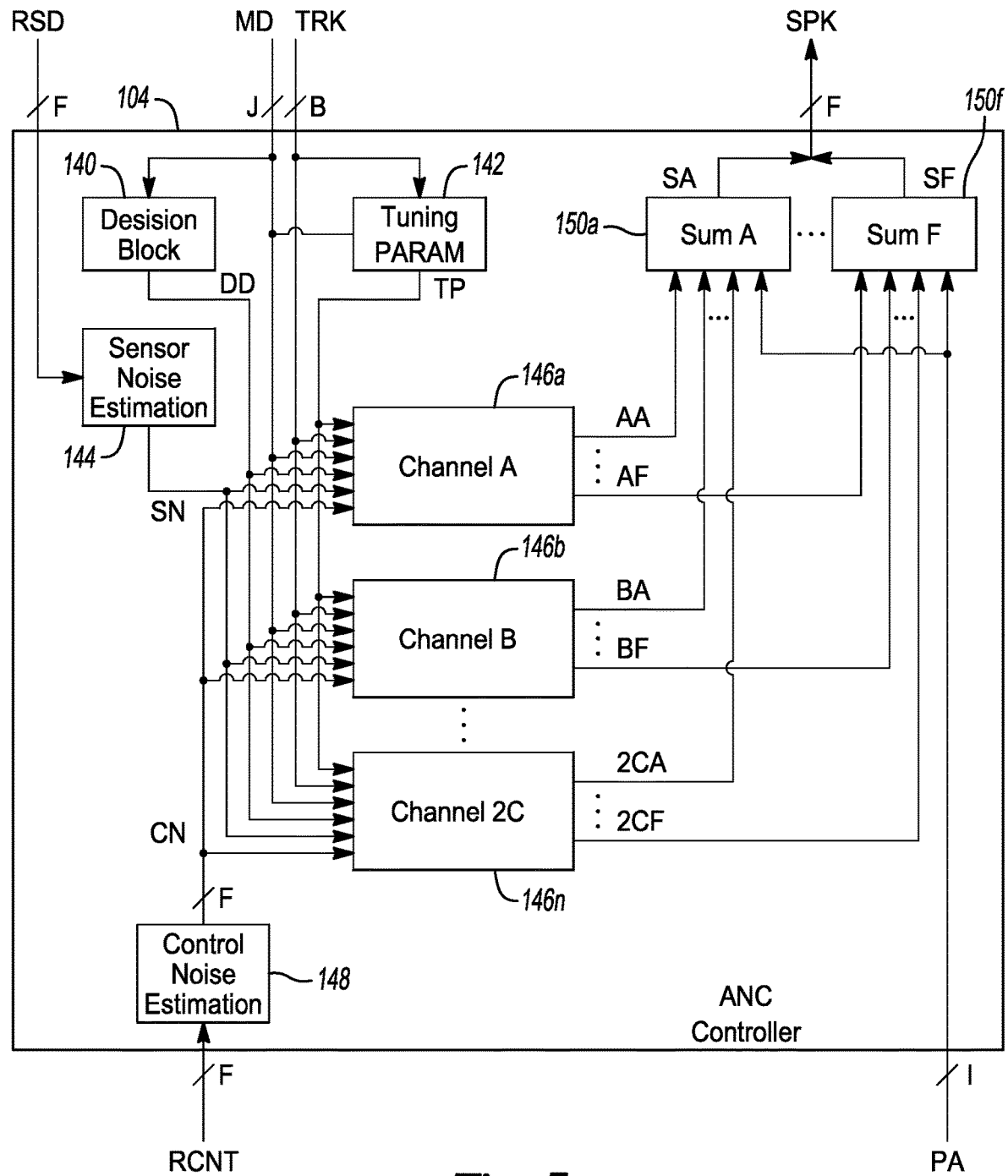
FIG. 5 is a schematic diagram of a controller in accordance with one or more exemplary embodiments.

Referring to FIG. 5, a schematic diagram of an example implementation of the controller 104 is shown in accordance with one or more exemplary embodiments. The controller 104 generally includes a decision block 140, a tuning parameter control 142, a sensor noise estimation block 144, multiple channels 146a-146n, a control noise estimation block 148, and multiple summation blocks 150a-150f.

The rotor sensor signals RSD are received by the sensor noise estimation block 144. The microphone signals MD are received by the decision block 140, the tuning parameter control 142, and the channels 146a-146n. The track signals TRK are received by the tuning parameter control 142 and the channels 146a-146n. The speaker signals SPK are generated by the summation blocks 150a-150f. The rotor control signals RCNT are received by the control noise estimation block 148. The public address signal PA is received by the summation blocks 150a-150f.

The decision block 140 generated a decision signal (e.g., DD) that is transferred to the channels 146a-146n. The decision signal DD conveys decision data used to control when to utilize/not utilize the data in the rotor sensor signals RSD. A tuning parameter signal (e.g., TP) is generated by the tuning parameter control 142 and transferred to the channels 146a-146n. The tuning parameter signals TP convey tuning data used to aid in convergence of the adaptive noise cancellation loops. The sensor noise estimation block 144 generate sensor noise signals (SN) that are provided to the channels 146a-146n. The sensor noise signals SN provide estimated noise sounds of the rotors 64a-64f based on the rotor sensor signals RSD. The control noise estimation block 148 generates control noise signals (e.g., CN) that are also provided to the channels 146a-146n. The control noise signals CN convey estimated noise sounds of the rotors 64a-64f based on the rotor control signals RCNT.

The channels 146a-146n generate respective sets of component signals (e.g., AA-AF, BA-BF, . . . , 2CA-2CF) that are received by the summation blocks 150a-150f. The component signals AA-2CF carry individual pieces of the cancellation audio sounds destined for each cancelling field 76a-76j. The summation blocks 150a-150f generate individual speaker signals (e.g., SA-SF) that are provided to the speakers 68a-68f (where combined, the individual speaker signals SA-SF make up the speaker signal SPK). The individual speakers signals SA-SF control the cancellation audio sounds CAA-CAF generated by the speakers 68a-68f.

The decision block 140 implements monitoring logic. The decision block 140 is operational to determine if the error noise in the microphone signals MD are increasing, staying constant, or decreasing. Where the error noise is constant or decreasing, the decision block 140 generates control data in the decision signal DD to cause the channels 146a-146n to disregard the sensor noise signals SN in adaptive noise cancellation loops. Where the error noise is increasing, the decision block 140 adjusts the control data in the decision signal DD to cause the channels 146a-146n to incorporate the sensor noise signals SN in the adaptive noise cancellation loops.

The tuning parameter control 142 implements a control circuit with multiple registers. The tuning parameter control 142 is operational to store tuning parameter values for the adaptive noise cancellation loops within the channels 146a-146n. The tuning parameter values are presented to the channels 146a-146n in the tuning parameter signals TP. Calibration generally provides an initial condition for the tuning parameters.

The sensor noise estimation block 144 implements a noise synthesizer. The sensor noise estimation block 144 is operational to generate an estimation of the rotor noise sounds RNA-RNF based on the rotor sensor signals RSD. The periodic noise in a rotor vehicle is due to the primary tones sensed by the rotor sensor signal RSD and the corresponding harmonics. In most cases, the harmonics make up the majority of the sound to be cancelled as calculated by an A-weighted OASPL (OverAll Sound Pressure Level). For each rotor 64a-64f, the harmonics may be assumed to maintain a fixed gain and fixed phase relationship to the corresponding primary tone. A calibration or analytical model is used to establish the fixed gain and the fixed phase relationships. For small deviations of the primary tones, the fixed gain and the fixed phase relationship is assumed to be constant. If the rotor sensor signals RSD solely sense the primary tones (like a tachometer), the sensor noise estimation block 144 uses the primary tones to estimate the amplitudes, frequencies and phases of the harmonics. In various embodiments, the sensor noise estimation block 144 may provide tone generators with the generated frequencies determined by multiples of the primary tones, phases and gains relative to the primary tones determined by calibration or analytical model. The harmonic generators become references for the harmonics to use in the cancellation technique using parallel adaptive noise cancellation circuitry. If the rotor sensor signals RSD are broadband sensor signals (like a microphone or an accelerometer) the sensor noise estimation block 144 may separate the signals into the primary and harmonics using bandpass filters. The primary tones and the harmonics then become references to use in cancellation by the parallel adaptive noise cancellation circuitry, each with a unique optimal solution to correct the gains and the phases for the primary tones and each harmonic. In various embodiments, the sensor noise estimation block 144 may be implemented as a multidimensional look-up table. The dimensions may be indexed by the values in the respective rotor sensor signals RSD.

The channels 146a-146n implement multiple adaptive noise cancellation loops, a channel for each hearing location 90a-90b. The channels 146a-146n are operational to generate the component signals AA-2CF that control the speakers 68a-68f to create the cancellation audio sounds CAA-CAF. The channels 146a-146n each include multiple adaptive noise cancellation loops. A primary adaptive noise cancellation loop is provided in each channel 146a-146n and one or more harmonic adaptive noise cancellation loops are included. The adaptive noise cancellation loops utilize (i) the rotor noise data in the control noise signals CN, and in some situations the sensor noise signals SN, as estimations of the rotor noise sounds RNA-RNF, and (ii) the microphone data in the microphone signals MD as an estimation of the noise errors. The channels 146a-146n subsequently determine correction data to attenuate the expected rotor noise sounds RNA-RNF. The correction data is parsed into the component signals AA-2CF to control the individual speakers 68a-68f. The channels 146a-146n account for movement of the hearing locations 90a-90b of each occupant 80a-80b through the tracking data in the track signals TRK. Changes to the tuning parameters are fed into the adaptive noise cancellation loops to improve the noise cancellation performance.

The control noise estimation block 148 implements a noise synthesizer. The control noise estimation block 148 is operational to generate an estimation of the rotor noise sounds RNA-RNF based on the rotor control signals RCNT. Similar to the case of rotor sensor signals RSD being generated by tachometers, the rotor control signals RCNT have information solely identifying the primary tones. The primary tones are used by the control noise estimation block 148 to generate reference tones for the harmonics with a fixed gain and phase relationships to the rotor control signals RCNT. Each component of the rotor control signals RCNT for each rotor 64a-64f generally has a higher signal-to-noise ratio than the corresponding signal from the rotor sensor signals RSD, but may contain information solely about the primary tone. The control noise estimation block 148 uses the fixed gain and phase relationships between the primary tones and the harmonics to provide reference information for cancellation of each of the harmonics. This is similar to the case when the rotor sensor signals RSD are generated by tachometers. In various embodiments, the control noise estimation block 148 may be implemented as a multidimensional look-up table. The dimensions may be indexed by the values in the respective rotor control signals RCNT.

The summation blocks 150a-150f are operational to add the component signals AA-2CF (e.g., AA+BA+CA+ . . . +2CA, AB+BB+CB+ . . . +2CB, AF+BF+CF+ . . . +2CF) to generate the respective individual speaker signals SA-SF. The summation blocks 150a-150f also add the public announcement signal PA equally into the individual speaker signals SA-SF.

Consider multiple (e.g., C) crew members (e.g., the occupants 80a-80b) in the vehicle 60, and each crew member having two ears 84a-84b. The noise cancellation is thus calculated for 2C spatial locations. The sensor noise estimation block 144 converts the rotor sensor data into a format that estimates the noise contributions of the rotors 64a-64f to the 2C ears 84a-84b. The control noise estimation block 148 converts the rotor control data into a format that estimates the noise contributions of the rotors 64a-64f to the 2C ears 84a-84b. The channels 146a-146n (e.g., channels A-2C) receive the noise estimations in noise signals SN and CN, the tuning parameters in the tuning parameter signals TP, the microphone data in the microphone signals MD, and the tracking data in the track signals TRK. Each channel 146a-146n is configured as multiple (e.g., 6) subchannels, a subchannel for each speaker 68a-68f. The subchannels generate the respective component signals AA-2CF. The component signals AA-2CF from each subchannel are added in the summation blocks 150a-150f and subsequently broadcast by the speakers 68a-68f to cancel the rotor noise sounds RNA-RNF at the 2C ears 84a-84b in the cabin 62.

Figure 6:
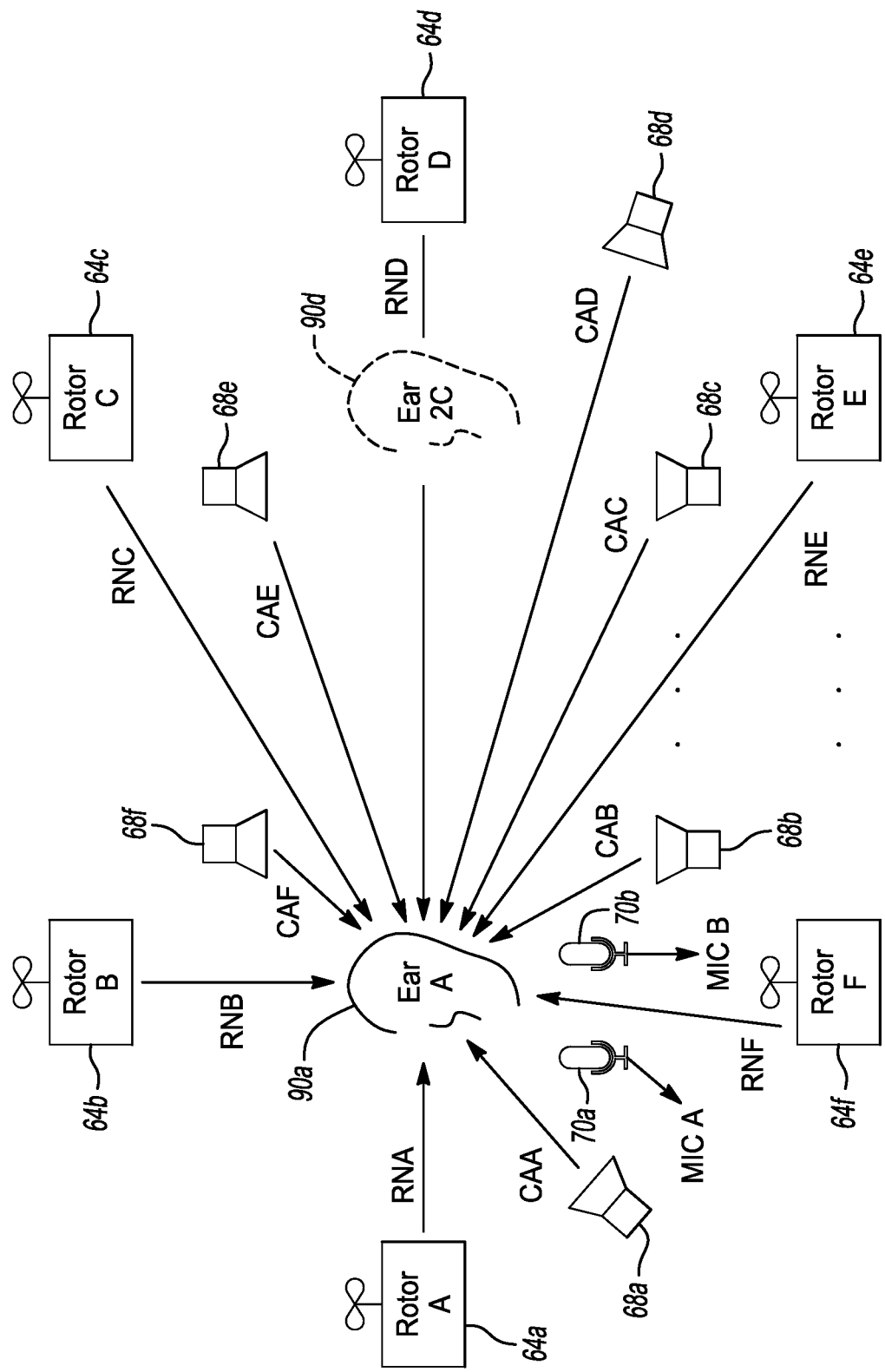
FIG. 6 is a schematic diagram illustrating a hearing location in accordance with one or more exemplary embodiments.

Referring to FIG. 6, a schematic diagram illustrating an example hearing location 90a is shown in accordance with one or more exemplary embodiments. The hearing location 90a may be considered the leftmost hearing location within the cabin 62. A hearing location 90d may be considered the rightmost hearing location within the cabin 62. For purposes of the example, the microphones 70a and 70b may be the closest microphones 70a-70j to the hearing location 90a. The two closest microphones 70a-70b may generate two initial microphone signals (e.g., MICA-MICB).

FIG. 6 illustrates a simple case where there is a single ear 84a (labeled ear A) in the hearing location 90a at a default point in space for consideration. The rotors 64a-64f are scattered around the ear A in different directions and different distances. The speakers 68a-68f are scattered around the ear A in different directions and different distances. The rotor noise sounds RNA-RNF each arrive at the hearing location 90a and are heard by ear A. The cancellation audio sounds CAA-CAF also arrive at the hearing location 90a and are heard by ear A. The microphone signals from the two closest microphones MICA and MICB may be averaged together to produce an error value E(N) for the adaptive noise cancellation loops in the controller 104 to determine how to cancel the rotor noise sounds RNA-RNF heard by ear A. The controller 104 accounts for the rotor sensor signals RSD and the rotor control signals RCNT because a sudden change in the leftmost rotor (e.g., 64a) generally has a larger impact on the rotor noise sound RNA at the ear A compared with the impact at the rightmost ear 2C. Therefore, channel A (performing the adaptive noise cancellation for the ear A) treats the rotor sensor signals RSD and the rotor control signals RCNT differently than the channel 2C (performing the adaptive noise cancellation for the ear 2C).

Figure 7:
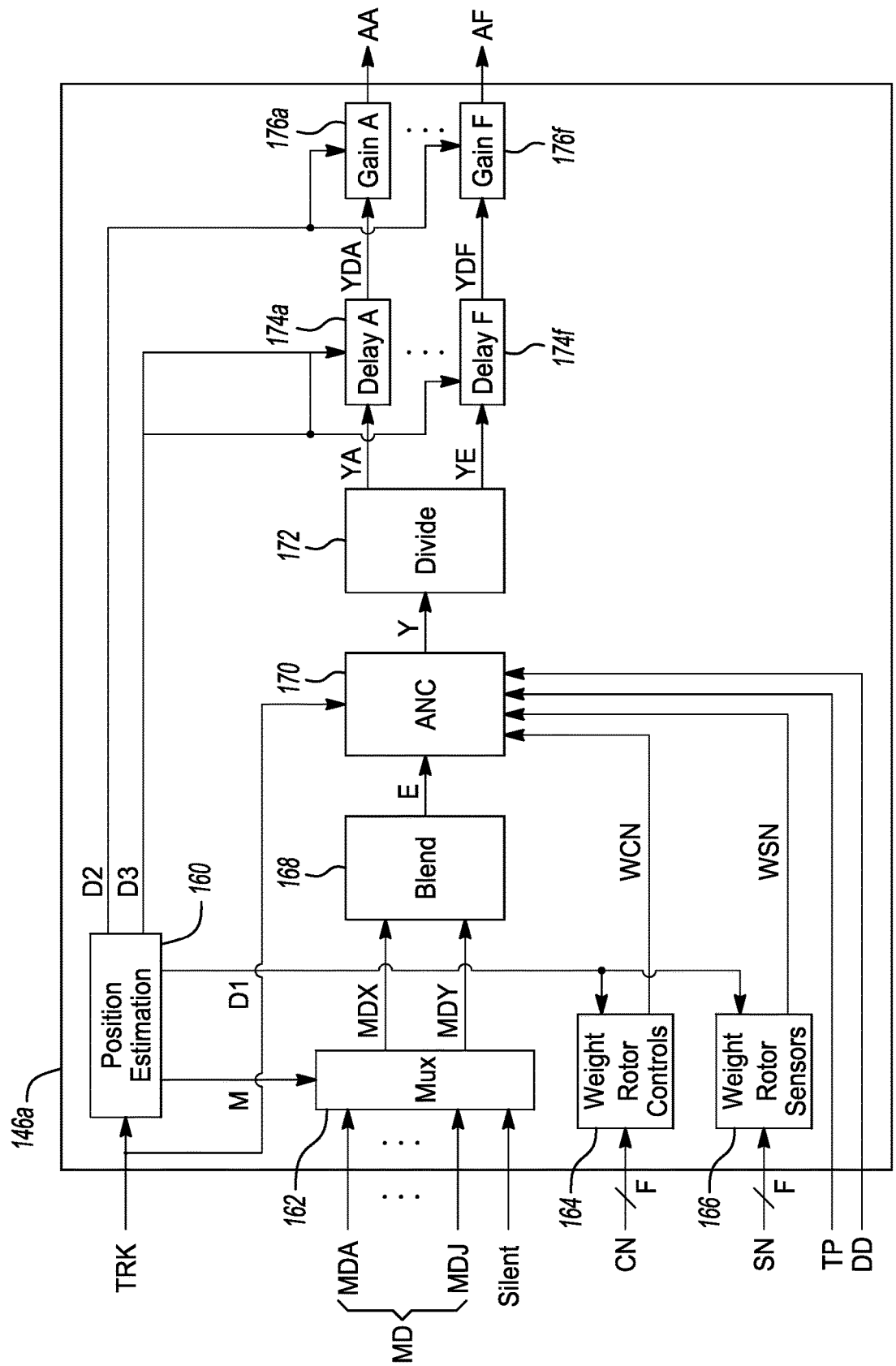
FIG. 7 is a schematic diagram of a channel in the controller in accordance with one or more exemplary embodiments.

Referring to FIG. 7, a schematic diagram of an example implementation of the channel 146a is shown in accordance with one or more exemplary embodiments. The implementation of channel 146a is representative of the other channels 146b-146n. Channel 146a generally includes a position estimation block 160, a multiplexer (MUX) 162, a weight rotor controls block 164, a weight rotor sensors block 166, a blend block 168, an adaptive noise cancellation (ANC) block 170, a divide block 172, multiple delay stages 174a-174f, and multiple gain stages 176a-176f.

The track signals TRK are received by the position estimation block 160. The microphone signals MD are received by the multiplexer 162. The microphone signals MD include individual microphone signals (e.g., MDA-MDJ) from the different microphones 70a-70j. The control noise signal CN is received by the weight rotor controls block 164. The sensor noise signals SN are received by the weight rotor sensors block 166. The tuning parameters signals TP and the decision data signal DD are received by the adaptive noise cancellation block 170. The component signals AA-AF are generated and presented by the gain stages 176a-176f.

A multiplexer control signal (e.g., M) is generated by the position estimation block 160 and received by the multiplexer 162. The multiplexer control signal M carries data that identifies the closest or the two closest microphones 70a-70j to the corresponding hearing location 90a. The position estimation block 160 also generates a first distance signal (e.g., D1), a second distance signal (e.g., D2), and a third distance signal (e.g., D3). The first distance signal D1 is conveys a measured distance from the hearing location 90a to the rotors 64a-64f, and is received by both the weight rotor controls block 164 and the weight rotor sensors block 166. The second distance signal D2 conveys gain control data to the gain stages 176a-176f. The third distance signal D3 carries delay control data to the delay stages 174a-174f.

A silent microphone signal (e.g., SILENT) is received by the multiplexer 162. The silent microphone signal SILENT simulates an additional microphone that reports a null error noise sound. The multiplexer 162 generates two closest microphone signals (e.g., MDX and MDY) that are received by the blend block 168. Each of the two closest microphone signals MDX and MDY are copies of one of the microphone signals MDA-MDJ or SILENT.

A weighted rotor control signal WCN is generated by the weight rotor controls block 164 and transferred to the adaptive noise cancellation block 170. The weighted rotor control signal WCN carries a weighted combination of the rotor control signals CN based on the first distance signal D1. A weighted rotor sensor signal WSN is generated by the weight rotor sensors block 166 and transferred to the adaptive noise cancellation block 170. The weighted rotor sensor signal WSN carries a weighted combination of the rotor sensor signals SN based on the first distance signal D1.

An error noise signal (e.g., E) is generated by the blend block 168 and presented to the adaptive noise cancellation block 170. The error noise signal E is either (i) a copy of the individual microphone signal MDA-MDJ where a single microphone 70a-70j is determined to be closest to the hearing location 90a, or (ii) a blending of the two closest microphone signals MDA-MDJ where two microphones 70a-70j are determined to be closest to the hearing location 90a. A correction signal (e.g., Y) is generated by the adaptive noise cancellation block 170 and received by the divide block 172. The correction signal Y carries correction data for cancelling the rotor noise signals RNA-RNF at the hearing location 90a.

The divide block 172 generates multiple internal signals (e.g., YA-YF) that are distributed to the delay stages 174a-174f. The internal signals YA-YF carry a portion of the correction data such that a sum of the cancellation audio sounds CAA-CAF from the speakers 68a-68f cancels, or at least attenuates, the rotor noise sounds RNA-RNF at the hearing location 90a. The delay stages 174a-174f generate delayed internal signals YDA-YDF that are received by the gain stages 176a-176f. The delayed internal signals YDA-YDF carry delayed versions of the correction data in the internal signals YA-YF to account for the relative phase shifts of the cancellation audio sounds CAA-CAF. The gain stages 176a-176f generate and present the component signals AA-AF.

The position estimation block 160 is operational to determine a spatial configuration of the ear 84a (e.g., the leftmost ear) at the hearing location 90a (e.g., the leftmost hearing location) based on the head configuration 94a-96f of the occupant 80a (e.g., the leftmost occupant) seated in the occupant location 66a (e.g., the leftmost occupant location). The position estimation block 160 utilizes the tracking data in the track signals TRK to determine which one or two microphones 70a-70j are closest to the hearing location 90a to generate the control data in the multiplexer control signal M. The position estimation block 160 also utilizes the tracking data in the track signals TRK to determine the distance data in the first distance signal D1, the delay data in the second distance signal D2, and the gain data in the third distance signal D3.

The multiplexer 162 implements an N-to-2 multiplexer. The multiplexer 162 is operational to route two of the individual microphone signals MDA-MDJ and the silent microphone signal SILENT in response to the multiplexer control signal M. Where the position estimation block 160 determines that two microphones 70a-70j are nearest to the hearing location 90a, two of the individual microphone signals MDA-MDJ are routed into the closest microphone signals MDX and MDY. Where the position estimation block 160 determines that a single microphone 70a-70j is nearest to the hearing location 90a, the multiplexer 162 routes that nearest individual microphone signal MDA-MDJ to the closest microphone signal MDX, and routes the silent microphone signal SILENT to the closest microphone signal MDY.

The blend block 168 implements an audio blending circuit. The blend block 168 is operational to blend the two closest microphone signals MDX and MDY together to generate the error signal E. Where two microphones 70a-70j are closest, the blended result in the error signal E is a combination of the two closest microphone signals MDA-MDJ. Where a single microphone 70a-70j is closest, the blend block 168 blends the closest microphone signal MDA- MDJ with silence and so generates the error signal E as a copy of the single closest microphone signal MDA-MDJ. In various embodiments, the blend may be an averaging of the two closest microphone signals MDX and MDY. Other blending techniques may be implemented to meet the design criteria of a particular application.

The adaptive noise cancellation block 170 is operational to implement a noise cancellation process that generates and updated the correction signal Y in an attempt to drive the error signal Y toward zero amplitude. In various embodiments, the adaptive noise cancellation block 170 may implement a filtered-x adaptive noise cancellation process. Other adaptive noise cancellation techniques may be implemented to meet the design criteria of a particular application.

The divide block 172 is operational to divide the correction signal Y into multiple (e.g., six) parts, a part of each speaker 68a-68f. In various embodiments, the division may separate the correction data in the correction signal Y into multiple equal parts in the internal signals YA-YF. In other embodiments, the division may be based on the occupant locations 66a-66b relative to the speakers 68a-68f with larger percentages of the correction data gong to the nearer speakers 68a-68f.

The delay stages 174a-174f implement controllable digital delay stages or phase delay stages. The delay stages 174a-174f are operational to delay the various components of the correction data by controlled amounts based on the delay control data in the third distance signal D3. The delayed/phase adjusted correction data is presented in the delayed signals YDA-YDJ.

The gain stages 176a-176f implement controllable digital amplification stages. The gain stages 176a-176f are operational to amplify the various delayed components of the correction data by controlled amounts base on the gain control data in the second distance signal D2. The amplitude adjusted correction data is presented in the component signals AA-AF. While FIG. 7 generally illustrates the details inside the channel 146a, similar designs may be implemented for the other channels 146b-146n.

Figure 8:
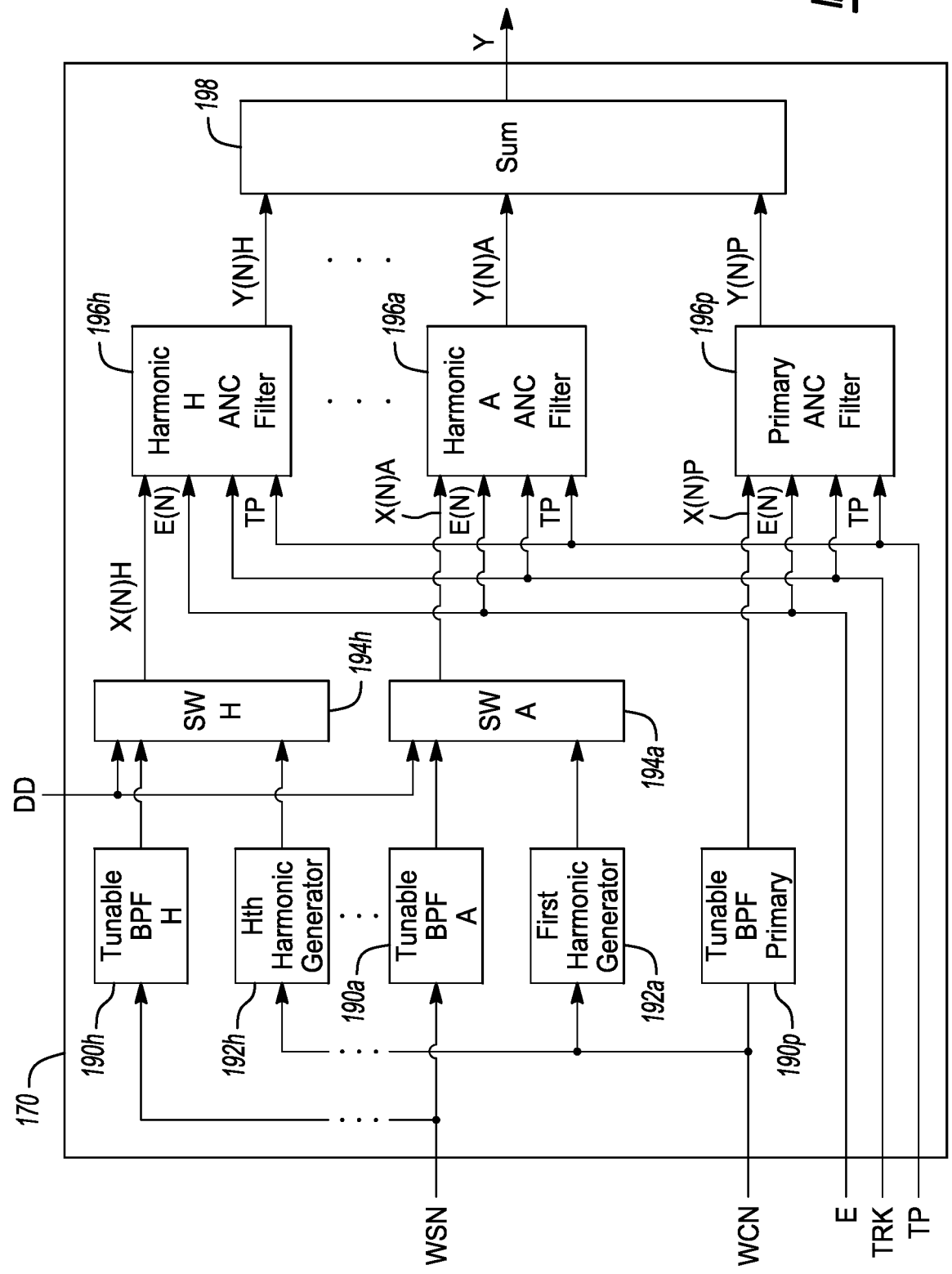
FIG. 8 is a schematic diagram of an adaptive noise cancellation block in the controller in accordance with one or more exemplary embodiments.

Referring to FIG. 8, a schematic diagram of an example implementation of the adaptive noise cancellation block 170 is shown in accordance with one or more exemplary embodiments. The adaptive noise cancellation block 170 generally includes a primary tunable bandpass filter 190p, one or more harmonic tunable bandpass filters 190a-190h, one or more harmonic generators 192a-192h, one or more switches 194a-194h, a primary adaptive noise cancellation filter 196p, one or more harmonic adaptive noise cancellation filters 196a-196h, and a summation block 198.

The weighted control noise signal WCN is received by the primary tunable bandpass filter 190p and the harmonic generators 192a-192h. The weighted sensor noise signal WSN is received by the harmonic tunable bandpass filters 190a-190h. The error signal E and the tuning parameter signals TP are received by the primary adaptive noise cancellation filter 196p and the harmonic adaptive noise cancellation filters 196a-196h. The decision data signal DD is received by the switches 194a-194h. The correction signal Y is generated and presented by the summation block 198.

The adaptive noise cancellation filters 196a-196p generate individual correction signals (e.g., Y(N)A-Y(N)P) that are received by the summation block 198. The individual correction signal Y(N)P conveys the correction data to cancel the primary component of the rotor noise heard at the hearing location 90a. The individual correction signals Y(N)A-Y(N)H convey the correction data to cancel the harmonic components of the rotor noise heard at the hearing location 90a.

The primary tunable bandpass filter 190p is operational to bandpass filter the primary frequency component of the estimated rotor noise in the weighted control noise signal WCN. The harmonic tunable bandpass filters 190a-190h are operational to bandpass filter the various harmonic frequency components of the estimated rotor noise in the weighted sensor noise signal WSN. The tunable bandpass filter 190a-190p are adjusted to account for changes in the speeds of the rotors 64a-64f and thus changes in the frequencies found in the rotor noise signals RNA-RNF.

Each harmonic generator 192a-192h is operational to generate an estimated noise sound at a different harmonic frequency of the primary frequency found in the weighted control noise signal WCN. In various embodiments, different numbers of harmonic generators 192a-192h may be implemented to recreate the noise spectrum of the rotor noise signals RNA-RNF.

The switches 194a-194h implement audio speed switches. The switches 194a-194h are operational to route either (i) the estimated harmonic noise components generated by the harmonic generators 192a-192h to the harmonic adaptive noise cancellation filters 196a-196h, or (ii) route the various sensor frequencies passed through the harmonic tunable bandpass filters 190a-190h to the harmonic adaptive noise cancellation filters 196a-196h. The switching control is provided by the decision data signal DD. In baseline situations, the adaptive noise cancellation block 170 disregards the weighted sensor noise signal WSN and so the adaptive noise cancellation is based on the error signal E and the weighted control noise signal WCN. In other situations where the noise in the hearing location 90a is increasing, the adaptive noise cancellation block 170 accounts for the weighted sensor noise signal WSN such that the primary frequency component of the correction data in the signal Y(N)P is based on the primary noise frequency in the weighted control noise signal WCN, and the harmonic frequency components of the correction data in the signals Y(N)A-Y(N)H are based on the weighted sensor noise signal WSN.

The adaptive noise cancellation filters 196a-196p implement adaptive noise cancellation blocks optimized at different frequencies. The primary adaptive noise cancellation filter 196p generates the correction data at the primary frequency. The harmonic adaptive noise cancellation filters 196a-196h generate the correction data at the harmonic frequencies.

The summation block 198 is operational to generate the correction data by adding the correction component data from the signals Y(N)A-Y(N)P. The correction data is presented in the correction signal Y.

Figure 9:
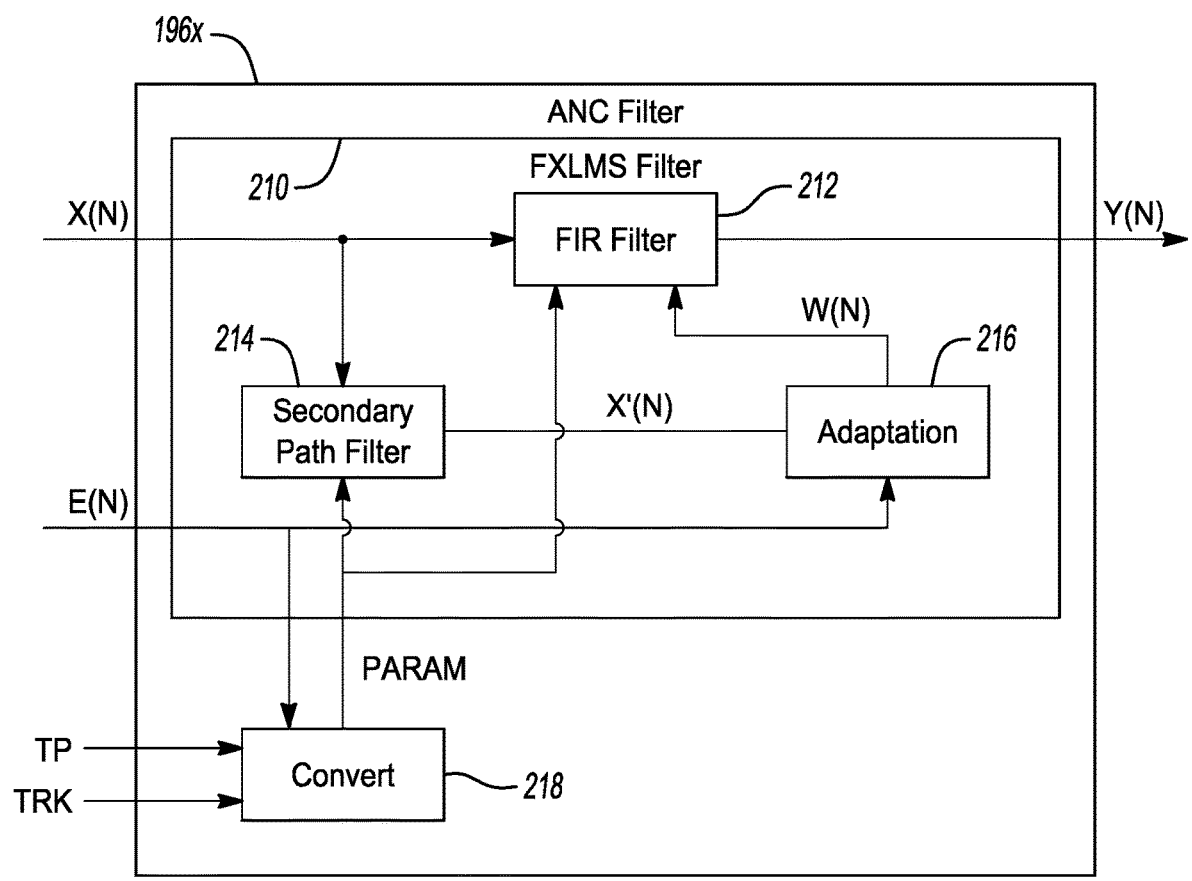
FIG. 9 is a schematic diagram of an adaptive noise cancellation filter in accordance with one or more exemplary embodiments.

Referring to FIG. 9, a schematic diagram of an example implementation of an adaptive noise cancellation filter 196x is shown in accordance with one or more exemplary embodiments. The adaptive noise cancellation filter 196x is representative of the adaptive noise cancellation filters 196a-196p. The adaptive noise cancellation filter 196x generally includes a filtered-x least mean square (FXLMS) adaptive noise cancellation filter 210, and a convert block 218. The FXLMS filter 210 generally includes a finite impulse response (FIR) filter 212, a secondary path filter 214, and an adaptation block 216.

The individual noise signal X(N) is received by the finite impulse response filter 212 and the secondary path filter 214. The individual correction signal Y(N) is generated and presented by the finite impulse response filter 212. The error signal E(N) is received by the adaptation block 216. The tuning parameter signals TP is received by the convert block 218.

A secondary path noise signal (e.g., X'(N)) is generated by the secondary path filter 214 and transferred to the adaptation block 216. The secondary path noise signal X'(N) estimates the effect of the secondary path on a respective correction noise signal. The adaptation block 216 generates an adaptation signal (e.g., W(N)) that is presented to the finite impulse response filter 212. The adaptation signal W(N) provides adjustments to the finite impulse response operations that adapt the FXLMS filter 210 to changes in the individual noise signal X(N) and the error signal E(N). A parameter signal (e.g., PARAM) is generated by the convert block 218 and presented to the FXLMS filter 210. The parameter signal PARAM conveys tuning parameters specific to the FXLMS filter 210.

The FXLMS filter 210 is operational to adaptively adjust the correction data in the individual correction signal Y(N) to reduce the error noise in the error signal E(N). The individual noise signal X(N) functions as a reference signal that is filtered by a primary acoustic path to give noise at a location of interest. The same reference signal is provided as input data to the secondary path filter 214 to cancel the noise. If both the reference signal, the primary path, and secondary path remain unchanged, the control filter may be determined for a system that does not change and noise is cancelled with the resulting error being near zero. In the real world, the primary path and the secondary path change over time as well as the reference signal. To adapt to the changes, the FXLMS technique uses a mathematical model of the secondary path in the secondary path filter 214, usually represented by coefficients of a finite input response filter, adapts results from the mathematical model along with the error signal E(N) in the adaptation block 216 to adjust the function of the finite impulse response filter 212 (also referred to as the LMS filter in other literature and defined by filter coefficients) with the adaptation signal W(N) to minimize the error. The convert block 218 is used when the head tracker 114 senses that the head position has changed. Because calibrations have been performed resulting in optimal tuning parameters for each head position, if the head position changes and the error sensor does not immediately react (e.g., within 1 second), the convert block 218 switches the finite impulse response filter 212 and the secondary path filter 214 to those derived for the new head position. Filter coefficients for each head position come from the tuning parameters stored during calibration.

For the vehicle 60, the primary path(s) start with the rotor control signals RCNT sent to the rotors 64a-64f. Since the rotor control signals RCNT are generated by the flight control system 106, full access to this reference is available to the controller 104. The primary paths end at the ears 84a-84b of each occupant 80a-80b. The actual noise spectrum is complicated as the reference signal defines a fundamental blade passage frequency of each rotor 64a-64f but the noise at the ears 84a-84b is made up of the fundamental (or primary) frequency and a number of harmonic frequencies. In many cases, due to the nature of a high pass filter sensitivity of the ears 84a-84b, the harmonic frequencies may be more of a noise issue than the fundamental frequency. The secondary path, in the case of the vehicle 60, is the audio signals to the speakers 68a-68f.

There are at least two expected factors for changes in the primary path and the secondary path. The first expected factor is movement of the heads 82 inside the cabin 62. The head movement may be measured with the camera 72, video processor 112, and head tracker 114. The second expected factor involves changes in the relative noise contributions of the rotors 64a-64f and the associated harmonics. Both factors may be accommodated with the FXLMS filter approach that uses the head tracking and the microphone averaging. If multiple microphones 70a-70j are included in the vehicle 60 proximate to the positions that the heads 82 are expected to be located, the head tracking may be used to define the secondary path for the FXLMS technique based on the head positions.

Figure 10:
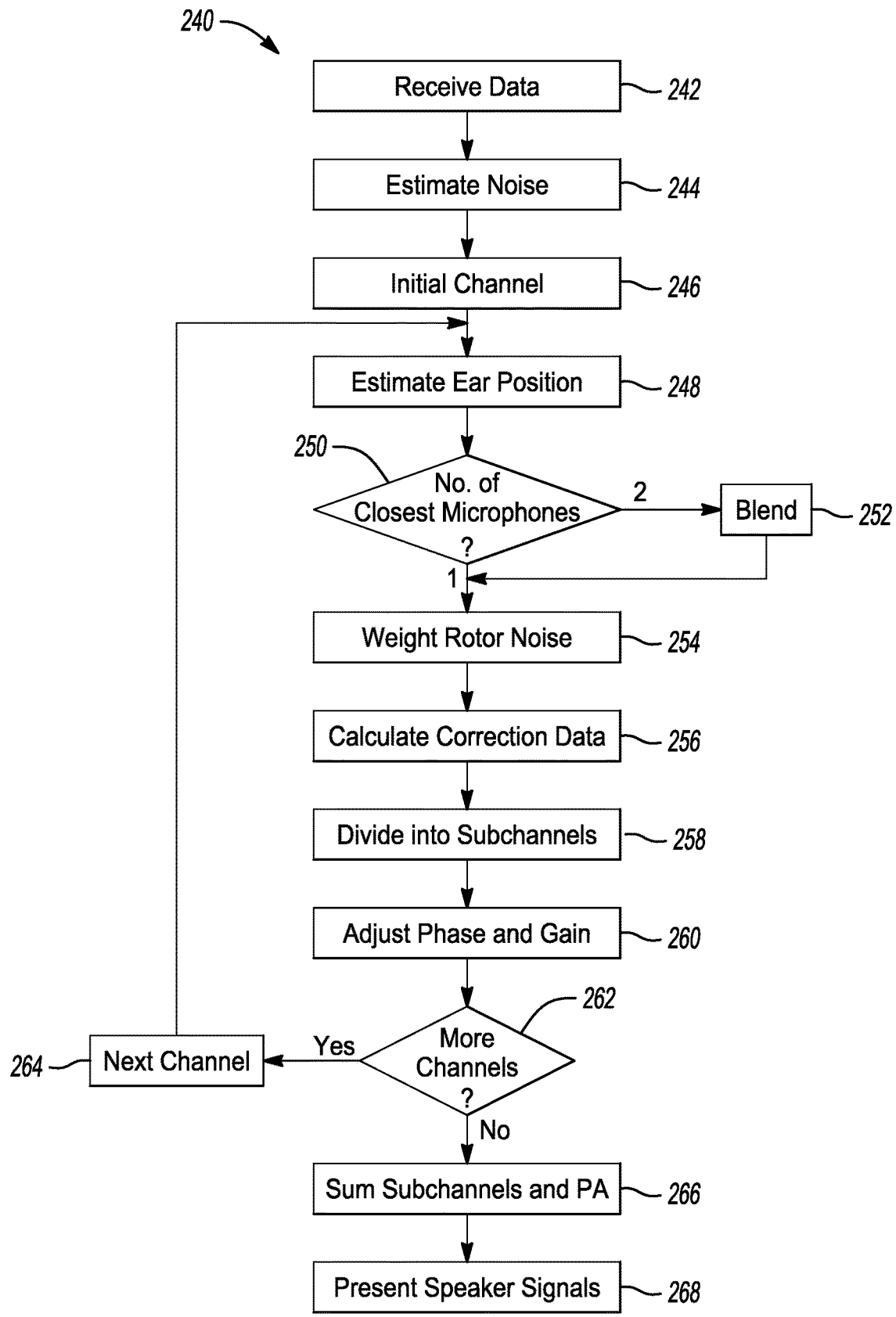
FIG. 10 is a flow diagram of a method for operation of the controller in accordance with one or more exemplary embodiments.

Referring to FIG. 10, a flow diagram of an example method 240 for operation of the controller 104 is shown in accordance with one or more exemplary embodiments. The method (or process) 240 may be implemented in the vehicle 60. The method 240 generally includes a step 242, a step 244, a step 246, a step 248, a step 250, a step 252, a step 254, a step 256, a step 258, a step 260, a step 262, a step 264, a step 266, and a step 268. The sequence of steps is shown as a representative example. Other step orders may be implemented to meet the criteria of a particular application.

In the step 242, the controller 104 may receive data from the microphones 70a-70j, the rotor sensor 74a-74f, and the flight control system 106. The controller 104 may estimate the rotor noise in the step 244 based on either the rotor control data or a combination of the rotor control data and the rotor sensor data. An initial channel (e.g., channel A) may be selected in the step 246.

In the step 248, the controller 104 may estimate the position of a corresponding ear 84 (e.g., ear A) based on the tracking data received from the head tracker 114. The controller 104 uses knowledge of the position of the ear A to determine how many microphones 70a-70j are closest in the step 250. If two microphones 70a-70j are closest, the controller 104 blends the microphone data in the step 252. If a single microphone 70a-70j is the closest, the method 240 continues to the step 254 with the single microphone data.

Estimated rotor noise based on the rotor sensors 74a-74f and the rotor control is weighted in the step 254 to account for differences each rotor 64a-64f contributes to the hearing location 90a of the ear A. In the step 256, the controller 104 calculates correction data for the ear A. The correction data is divided (or parsed) into subchannels in the step 258 to spread the correction data among the speakers 68a-68f. In the step 260, the gain, and the phase in the subchannels are adjusted based on the head tracking data and the structure of interior of the cabin 62. In the step 262, the controller 104 checks if each channel has been processed. If not, the controller 104 advances to the next channel (e.g., channel B) in the step 264 and the method 240 returns to the step 248 to estimate the hearing location 90b of the ear B.

After each channel has been processed, the subchannels are summed together by the controller 104 in the step 266. The summed subchannel data is converted to analog data, amplified, and presented to the speakers 68a-68f in the step 268. Afterwards, the cancellation audio sounds CAA-CAF attenuate the rotor noise sounds RNA-RNF at the hearing locations.

Figure 11:
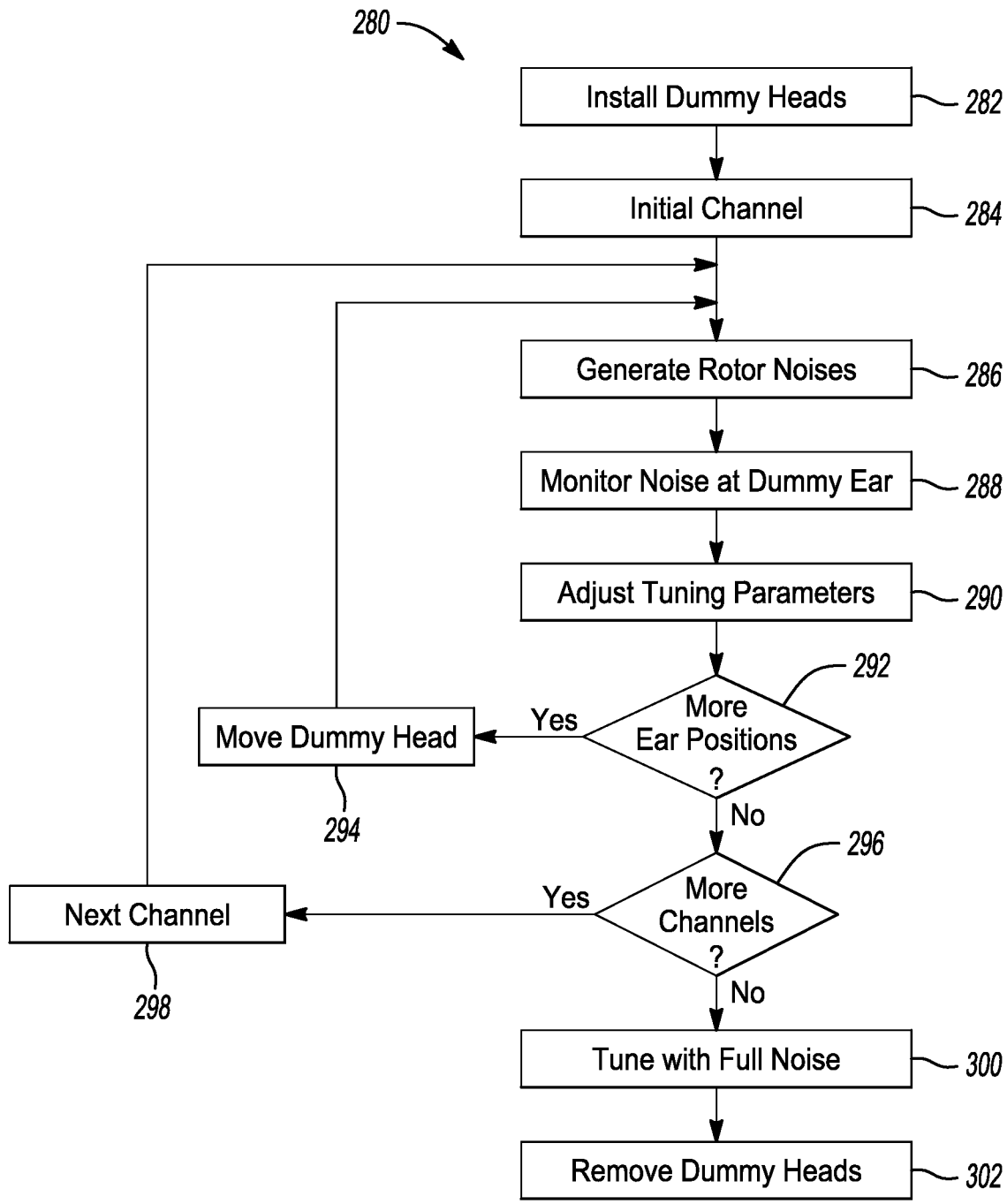
FIG. 11 is a flow diagram of a method 280 for tuning the controller in accordance with one or more exemplary embodiments.

Referring to FIG. 11, a flow diagram of an example method 280 for tuning the controller 104 is shown in accordance with one or more exemplary embodiments. The method (or process) 280 may be implemented with the vehicle 60 tethered to the ground. The method 280 generally includes a step 282, a step 284, a step 286, a step 288, a step 290, a step 292, a step 294, a step 296, a step 298, a step 300, and a step 302. The sequence of steps is shown as a representative example. Other step orders may be implemented to meet the criteria of a particular application.

Tuning the adaptive noise cancellation loops for the individual rotors 64a-64f may be performed as a ground test with the adaptive noise cancellation loops, one propeller at a time, by operating the rotor 64a-64f in an expected range with a means of keeping the vehicle 60 from leaving the ground. The tuning process for each adaptive noise cancellation loop may address the primary tones and the harmonics of interest. The tuning may be done for error sensors (e.g., microphones) that are located in the ears of a commercially available dummy heads positioned in the occupant locations 66a-66b in the step 282. An initial channel (e.g., channel A) may be selected in the step 284 to account for the hearing location 90a.

In the step 286, rotor noise is generated by operating the rotors 64a-64f in an intended range of speeds. The resulting rotor noise is monitored in the step 288 at the dummy ears. The tuning parameters in the tuning parameter control 142 are manually adjusted in the step 290 based on the monitoring to optimize the noise cancellation. After the initial channel has been tuned, a check is performed in the step 292 to determine if additional ear positions remain to be considered. If yes, the dummy heads may be moved in the step 294 and the method 280 returns to the step 286. After the ear positions for the initial channel have been tested, a check is performed in the step 296 to determine if some of the channels remain to be tuned. If yes, a next channel (e.g., channel B) is selected in the step 298 and the method 280 returns to the step 286 to repeat the channel tests.

To accommodate motion of the occupants 80a-80b, tuning of individual adaptive noise cancellation loops for each microphone 70a-70j in an array may also be performed. The head tracker 114 is implemented based on the video signal VIDEO from the camera 72. The head tracker 114 enables automatic switching of the adaptive noise cancellation controller 104 so that adaptive noise cancellation loops that have been tuned for the microphones 70a-70j closest to the ears are utilized.

Once tuning for the individual rotors 64a-64f have been accomplished, the adaptive noise cancellation loops may run simultaneously in the step 300 with the rotors 64a-64f creating superposed cancelling fields 76a-76j for the superposed disturbances. In some situations, the cancelling fields 76a-76j may be tested with the vehicle 60 on the ground and may result in further tuning of individual adaptive noise cancellation loops.

The tuning process may be automated and proceeds with each individual adaptive noise cancellation loop being tuned with each rotor 64a-64f running in an intended range, followed by a final tuning with the rotors 64a-64f running in the intended range. The adaptation in each adaptive noise cancellation loop generally compensates for the small differences between the ground test and flight. Upon completion of the tuning, the dummy heads may be removed in the step 302.

Figure 12:
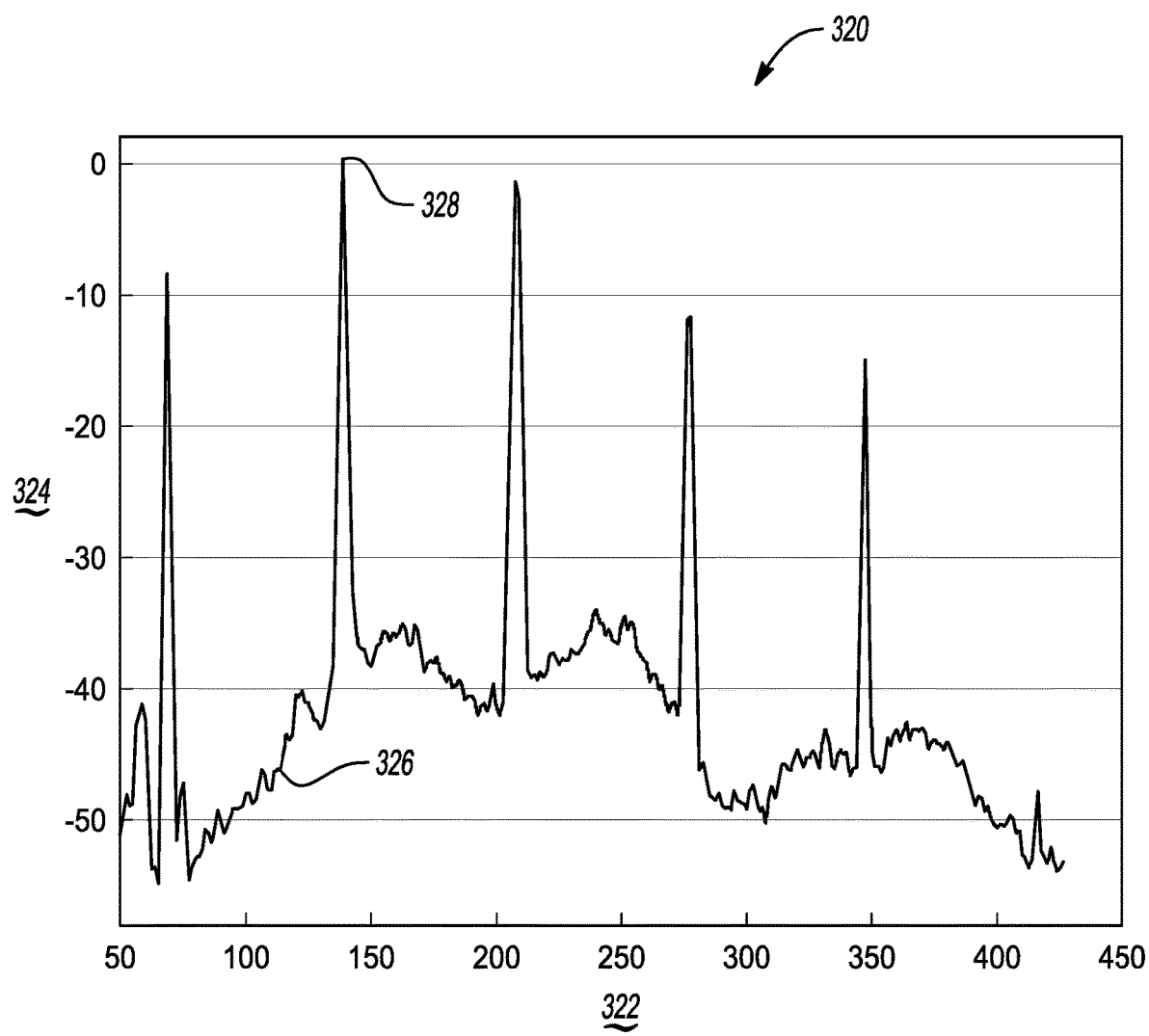
FIG. 12 is a graph of measured noise as a function of frequency in accordance with one or more exemplary embodiments.

Referring to FIG. 12, a graph 320 of measured noise as a function of frequency is shown in accordance with one or more exemplary embodiments. The graph 320 has an axis 322 for frequency in units of hertz (Hz). The graph 320 has another axis 324 for magnitude in units of decibels (dB). The axis 324 is normalized to a maximum noise set at zero dB.

A noise spectrum was recorded during a ground run of the Pegasus Air Vehicle in an interior of a cabin. The recorded noise is illustrated as a curve 326. The curve 326 shows a primary frequency at approximately 70 Hz. Harmonics appear as peaks at integer multiples of the primary 70 Hz. The loudest noise 328 was measured at the first harmonic at approximately 140 Hz.

During operation, the noise sounds generated by the rotors 64a-64f are attenuated at the ears of the occupants 80a-80b such that a public address announcement and/or telephone calls routed through the speakers 68a-68f are superposed onto the cancelled fields 76a-76j and may be heard as if there were little to no sound disturbance, greatly increasing speech intelligibility.

In various situations, depending on the frequency range of the disturbance and the wavelength of the cancelled sound, a good cancelling solution for one occupant 80a-80b may increase the overall sound for the other occupant 80a-80b. For low frequency sounds, where the dimensions of the cabin 62 are small compared with the wavelength, the different noise levels experienced by the different occupants 80a-80b is typically not a problem, since the phasing of the disturbance may be uniform across the cabin 62. Higher frequencies, where the wavelength of the sound is small or on the same order as the size of the cabin 62, pose a different situation A way to address such situations is that the tuning process includes a tuning case where the error sensor is an average of the amplitude of the microphones 70a-70j at the heads of both of the dummy heads. The camera 72 automatically implements the two-passenger tuning when two occupants 80a-80b are present in the occupant locations 66a-66b. Additional tuning cases and logic may also be considered for head motion of greater than two occupants 80a-80b.

In problems where cancellation is desired in a larger and/or commercially available space, such as a turboprop aircraft, the sound transmission path is more complicated. The noise generated by the aircraft propeller blades includes primary frequencies and harmonic frequencies, so the references are known. However, the paths between the propeller input and the ears of the occupants 80a-80b may be complicated. Furthermore, cancellation may be formulated at a given microphone 70a-70j using one or more speakers 68a-68f inside the aircraft. Cancellation at one microphone 70a-70j may be achieved while the overall noise in the cabin 62 is not reduced. To achieve reduction in a large cabin, multiple speakers 68a-68f and multiple microphones 70a-70j may be implemented. Additional noise reduction at higher harmonics of the propeller may be achieved by implementing more speakers 68a-68f and microphones 70a-70j. Adaptation is helpful because whenever an occupant 80a-80b moves in the cabin 62, equipment is moved in the cabin 62, or the blade passage frequency is changed, the optimal answer for the noise cancellation also changes.

Embodiments of the disclosure provide for a system and/or method for reducing noise within the passenger compartment of an aircraft. More specifically, the disclosure provides an adaptive noise cancellation system 100 for quieting the passenger compartment without utilizing headphones or other devices worn by the occupants 80a-80b of the vehicle 60. The adaptive noise cancellation may be applicable to multi-rotor vehicles, particularly personal air vehicles. Such types of vehicles typically involve vertical lift/descent components of missions, during which significant noise is produced by the spinning rotors 64a-64f.

In various embodiments, the adaptive noise cancellation system 100 leverages the sound system within the vehicle 60, and further includes monitoring devices at each occupant location 66a-66b. The monitoring devices may include cameras 72 and microphones 70a-70j for detecting a configuration of each occupant 80a-80b. The cameras 72 provide video that enables tracking of head movement of the occupants 80a-80b to help identify ear locations, and the microphones 70a-70j are typically an array for averaging the unpleasant sounds at the given head locations.

The data generated by the monitoring devices provide feedback to the adaptive noise cancellation system 100. Based upon the feedback, the adaptive noise cancellation system 100 produces cancellation audio sounds to cancel the rotor noise specific to particular locations within the cabin 62. The adaptive noise cancellation system 100 is adaptive, such that the noise cancellation produced is modified for each location, in real time, based upon the feedback received. In other words, the microphones 70a-70j and the camera 72 continuously monitor the occupants 80a-80b, and the system modifies the cancellation audio sounds, based on the data from the monitoring devices to ensure audio comfort for the occupants 80a-80b. In various embodiments, the adaptive noise cancellation system 100 employs the filtered-x least mean square technique.

This disclosure is susceptible of embodiments in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Background, Summary, and Detailed Description sections, but not explicitly set forth in the claims, should not be incorporated into the claims, singly or collectively, by implication, inference or otherwise.

For purposes of the present detailed description, unless specifically disclaimed, the singular includes the plural and vice versa. The words "and" and "or" shall be both conjunctive and disjunctive. The words "any" and "all" shall both mean "any and all", and the words "including," "containing," "comprising," "having," and the like shall each mean "including without limitation." Moreover, words of approximation such as "about," "almost," "substantially," "approximately," and "generally," may be used herein in the sense of "at, nearing, or nearly at," or "within 0-5% of," or "within acceptable manufacturing tolerances," or other logical combinations thereof. Referring to the drawings, wherein like reference numbers refer to like components.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each characteristic described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A noise cancellation system for cancelling sounds within a vehicle, the noise cancellation system comprising:
   a plurality of microphones disposed adjacent to a plurality of occupant locations inside the vehicle, and configured to generate a plurality of microphone signals representative of a plurality of noise sounds and a plurality of cancellation audio sounds adjacent to the plurality of occupant locations;
   a camera configured to generate a video signal that captures one or more head configurations of one or more occupants at the plurality of occupant locations;
   a controller configured to:
      receive a plurality of rotor control signals from a flight control system of the vehicle;
      calculate a plurality of hearing locations based on tracking data of the one or more head configurations of the one or more occupants in response to the video signal; and
      generate a plurality of speaker signals based on the plurality of hearing locations, the plurality of microphone signals, and the plurality of rotor control signals; and
   a plurality of speakers disposed adjacent to the plurality of occupant locations, and configured to generate the plurality of cancellation audio sounds in response to the plurality of speaker signals, wherein the plurality of cancellation audio sounds attenuates the plurality of noise sounds at the plurality of hearing locations; wherein
   each of the one or more head configurations comprises a respective spatial head location and a respective spatial head orientation;
   and the controller is further configured to determine either a single closest microphone or two closest microphones among the plurality of microphones for each of the plurality of hearing locations based on the respective spatial head location and the respective spatial head orientation.

2. The noise cancellation system according to claim 1, wherein the controller is further configured to generate a respective error signal for each of the plurality of hearing locations as either a respective microphone signal from the single closest microphone or a blend of two respective microphone signals from the two closest microphones.

3. The noise cancellation system according to claim 2, wherein the controller is further configured to:
   generate a respective weighted rotor control signal for each respective hearing location of the plurality of hearing locations based on the plurality of rotor control signals and the respective hearing location; and
   generate a respective correction signal for each of the plurality of hearing locations in response to the respective error signal and the respective weighted rotor control signal, wherein the plurality of cancellation audio sounds is based on a combination of the respective correction signals.

4. The noise cancellation system according to claim 2, wherein the plurality of noise sounds is generated by a plurality of rotors of the vehicle in response to the plurality of rotor control signals.

5. The noise cancellation system according to claim 4, further comprising a plurality of rotor sensors coupled to the plurality of rotors, and configured to generate a plurality of rotor sensor signals representative of a plurality of rotational speeds of the plurality of rotors.

6. The noise cancellation system according to claim 5, wherein the controller is further configured to:
   generate a respective weighted rotor sensor signal for each respective hearing location of the plurality of hearing locations based on the plurality of rotor sensor signals and the respective hearing location; and generate a respective correction signal for each of the plurality of hearing locations in response to the respective error signal and the respective weighted rotor sensor signal, wherein
the plurality of cancellation audio sounds is based on a combination of the respective correction signals.

7. The noise cancellation system according to claim 2, wherein the controller is further configured to:
generate a respective correction signal for each of the plurality of hearing locations by adaptive noise cancellation of the respective error signal; and
generate a plurality of internal signals for each of the plurality of hearing locations by parsing the respective correction signal among the plurality of speakers.

8. The noise cancellation system according to claim 7, wherein the controller is further configured to:
generate a plurality of respective component signals for each of the plurality of hearing locations by adjusting the plurality of internal signals; and
generate the plurality of speaker signals for each of the plurality of hearing locations by summing the plurality of respective component signals of the plurality of hearing locations.

9. A method for cancelling sounds within a vehicle, the method comprising:
generating a plurality of microphone signals representative of a plurality of noise sounds and a plurality of cancellation audio sounds adjacent to a plurality of occupant locations within the vehicle;
generating a video signal that captures one or more head configurations of one or more occupants at the plurality of occupant locations;
receiving a plurality of rotor control signals at a controller from a flight control system of the vehicle;
calculating a plurality of hearing locations of the one or more occupants based on tracking data of the one or more head configurations in response to the video signal;
generating a plurality of speaker signals based on the plurality of hearing locations, the plurality of microphone signals, and the plurality of rotor control signals; and
generating the plurality of cancellation audio sounds in response to the plurality of speaker signals, wherein the plurality of cancellation audio sounds attenuates the plurality of noise sounds at the plurality of hearing locations; wherein
each of the one or more head configurations comprises a respective spatial head location and a respective spatial head orientation, and the method further comprises:
determining either a single closest microphone or two closest microphones among a plurality of microphones for each of the plurality of hearing locations based on the respective spatial head location and the respective spatial head orientation.

10. The method according to claim 9, further comprising:
generating a respective error signal as either a respective microphone signal from the single closest microphone or a blend of two respective microphone signals from the two closest microphones for each of the plurality of hearing locations.

11. The method according to claim 10, further comprising:
generating a respective weighted rotor control signal for each respective hearing location of the plurality of hearing locations based on the plurality of rotor control signals and the respective hearing location; and
generating a respective correction signal for each of the plurality of hearing locations in response to the respective error signal and the respective weighted rotor control signal, wherein the plurality of cancellation audio sounds is based on a combination of the respective correction signals.

12. The method according to claim 10, wherein the plurality of noise sounds is generated by a plurality of rotors of the vehicle in response to the plurality of rotor control signals.

13. The method according to claim 12, further comprising:
generating a plurality of rotor sensor signals representative of a plurality of rotational speeds of a plurality of rotors.

14. The method according to claim 13, further comprising:
generating a respective weighted rotor sensor signal for each respective hearing location of the plurality of hearing locations in response to the plurality of rotor sensor signals and the respective hearing location; and
generating a respective correction signal for each of the plurality of hearing locations in response to the respective error signal and the respective weighted rotor sensor signal, wherein the plurality of cancellation audio sounds is based on a combination of the respective correction signals.

15. The method according to claim 10, further comprising:
generating a respective correction signal for each of the plurality of hearing locations by adaptive noise cancellation of the respective error signal;
generating a plurality of internal signals for each of the plurality of hearing locations by parsing the respective correction signal among a plurality of speakers;
generating a plurality of respective component signals for each of the plurality of hearing locations by adjusting the plurality of internal signals; and
generating the plurality of speaker signals by summing the plurality of respective component signals of the plurality of hearing locations.

16. A vehicle comprising:
a plurality of rotors configured to receive a plurality of rotor control signals, and generate a plurality of noise sounds at a plurality of occupant locations inside the vehicle in response to the plurality of rotor control signals;
a plurality of rotor sensors coupled to the plurality of rotors, and configured to generate a plurality of rotor sensor signals representative of a plurality of rotational speeds of the plurality of rotors;
a computer coupled to the plurality of rotor sensors, and configured to:
generate a plurality of microphone signals representative of the plurality of noise sounds and a plurality of cancellation audio sounds adjacent to the plurality of occupant locations;
generate a video signal that captures one or more head configurations of one or more occupants at the plurality of occupant locations;
receive the plurality of rotor control signals;
calculate a plurality of hearing locations of the one or more occupants based on tracking data of the one or more head configurations in response to the video signal; and
generate a plurality of speaker signals based on the plurality of hearing locations, the plurality of microphone signals, the plurality of rotor control signals, and the plurality of rotor sensor signals; and a plurality of speakers configured to generate the plurality of cancellation audio sounds in response to the plurality of speaker signals, wherein the plurality of cancellation audio sounds attenuates the plurality of noise sounds at the plurality of hearing locations; wherein:

the computer is further configured to:
- generate a respective error signal for each of the plurality of hearing locations in response to at most two of the plurality of microphone signals;
- generate a respective weighted rotor control signal for each respective hearing location of the plurality of hearing locations based on the plurality of rotor control signals and the respective hearing location; and
- generate a respective correction signal for each of the plurality of hearing locations in response to the respective error signal and the respective weighted rotor control signal; and the plurality of speaker signals is generated in response to a combination of the respective correction signals for the plurality of hearing locations.

17. The vehicle according to claim 16, wherein:

the computer is further configured to:
- generate a respective error signal for each of the plurality of hearing locations in response to at most two of the plurality of microphone signals;
- generate a respective weighted rotor sensor signal for each respective hearing location of the plurality of hearing locations based on the plurality of rotor sensor signals and the respective hearing location; and
- generate a respective correction signal for each of the plurality of hearing locations in response to the respective error signal and the respective weighted rotor sensor signal; and the plurality of speaker signals is generated in response to a combination of the respective correction signals for the plurality of hearing locations.

* * * * *